United States Patent
Sissom et al.

(10) Patent No.: US 7,551,336 B2
(45) Date of Patent: Jun. 23, 2009

(54) MINIATURE SINGLE ACTUATOR SCANNER FOR ANGLE MULTIPLEXING WITH CIRCULARIZING AND PITCH CORRECTION CAPABILITY

(75) Inventors: Bradley J. Sissom, Boulder, CO (US); Rodney C. Harris, Fort Collins, CO (US)

(73) Assignees: InPhase Technologies, Inc., Longmont, CO (US); Nintendo Co., Ltd., Kyoto (JP)

(*) Notice: Subject to any disclaimer, the term of this patent is extended or adjusted under 35 U.S.C. 154(b) by 0 days.

(21) Appl. No.: 12/104,470

(22) Filed: Apr. 17, 2008

(65) Prior Publication Data
US 2008/0197263 A1 Aug. 21, 2008

Related U.S. Application Data

(62) Division of application No. 11/833,613, filed on Aug. 3, 2007, now Pat. No. 7,405,853.

(60) Provisional application No. 60/835,108, filed on Aug. 3, 2006.

(51) Int. Cl.
G02B 26/08 (2006.01)
(52) U.S. Cl. .................. 359/198; 359/224; 359/225
(58) Field of Classification Search ............ 359/198, 359/225
See application file for complete search history.

(56) References Cited
U.S. PATENT DOCUMENTS

| | | | |
|---|---|---|---|
| 3,952,835 A * | 4/1976 | Blinow .................. | 185/11 |
| 4,732,440 A | 3/1988 | Gadhok | |
| 5,082,337 A | 1/1992 | Chern et al. | |
| 5,898,544 A | 4/1999 | Krinke et al. | |
| 5,959,281 A | 9/1999 | Domiteaux | |
| 6,103,454 A | 8/2000 | Dhar et al. | |
| 6,275,319 B1 | 8/2001 | Gadhok | |
| 6,482,551 B1 | 11/2002 | Dhar et al. | |
| 6,650,447 B2 | 11/2003 | Curtis et al. | |
| 6,743,552 B2 | 6/2004 | Setthachayanon et al. | |
| 6,765,061 B2 | 7/2004 | Dhar et al. | |

(Continued)

OTHER PUBLICATIONS

PCT/US2008/060014 International Search Report and the Written Opinion of the International Searching Authority, or the Declaration, mailed Aug. 8, 2008.

(Continued)

*Primary Examiner*—James Phan
(74) *Attorney, Agent, or Firm*—Jagtiani + Guttag

(57) ABSTRACT

The present invention provides a scanner comprising: a reflector component; means supporting the reflector component for pivoting with respect to the MCR to provide a scan which is stationary with respect to the OCR; means for enabling the support means to provide controlled pivoting of the reflector component; a magnet component which causes pivoting of the reflector component when actuated; and means for actuating the magnet component to thereby cause pivoting of the reflector component. Also provided is a scanner comprising a reflective prism for providing a circularized scanning beam, a prism carrier and magnet suspension assembly, and flexure means connected to the assembly to enable the prism to controllably pivot: (1) with respect to the MCR axis to provide a scan which is stationary with respect to the OCR; and (2) with respect to a pitch axis orthogonal to the MCR to provide an orthogonal scan.

8 Claims, 13 Drawing Sheets

U.S. PATENT DOCUMENTS

| | | | |
|---|---|---|---|
| 6,780,546 | B2 | 8/2004 | Trentler et al. |
| 6,801,260 | B1 | 10/2004 | Veksland et al. |
| 6,972,885 | B2 | 12/2005 | Hiley et al. |
| 6,974,930 | B2 | 12/2005 | Jense |
| 7,123,416 | B1 | 10/2006 | Erdogan et al. |
| 7,411,708 | B2 | 8/2008 | Waldman et al. |
| 2002/0162939 | A1 | 11/2002 | Heidrich |
| 2002/0166893 | A1 | 11/2002 | Li et al. |
| 2002/0176181 | A1 | 11/2002 | Jacobsen |
| 2003/0034552 | A1 | 2/2003 | Wada et al. |
| 2003/0047608 | A1 | 3/2003 | Huss et al. |
| 2003/0053232 | A1* | 3/2003 | Dalziel ........................ 359/877 |
| 2003/0206320 | A1 | 11/2003 | Cole et al. |
| 2004/0027625 | A1 | 2/2004 | Trentler et al. |
| 2004/0150872 | A1 | 8/2004 | Neukermans et al. |
| 2004/0213464 | A1 | 10/2004 | Hanson et al. |
| 2006/0006305 | A1 | 1/2006 | Fukai |
| 2006/0274391 | A1 | 12/2006 | Dickson et al. |
| 2006/0279821 | A1 | 12/2006 | Riley et al. |
| 2007/0091399 | A1 | 4/2007 | Ihas et al. |

OTHER PUBLICATIONS

PCT/US2007/076979 International Search Report and the Written Opinion of the International Searching Authority, or the Declaration, mailed Aug. 20, 2008.

PCT/US2007/005636 International Preliminary Report on Patentability (Chap. 1 of the Patent Cooperation Treaty) and the Written Opinion of the International Searching Authority, mailed Sep. 18, 2008.

Mcleod, et al., "Micro-Holographic Multi-Layer Optical Disk Data Storage," International Symposium on Optical Memory and Optical Data Storage, Jul. 2005.

PCT/US07/05636 International Search Report and the Written Opinion of the International Searching Authority, or the Declaration, mailed Mar. 13, 2008.

PCT/US07/77822 International Search Report and the Written Opinion of the International Searching Authority, or the Declaration, mailed Mar. 20, 2008.

PCT/US07/75176 International Search Report and the Written Opinion of the International Searching Authority, or the Declaration, mailed Apr. 3, 2008.

Urey, et al., " Scanner Design and Resolution Tradeoffs for Miniature Scanning Displays," Conference on Flat Panel Display Tech & Display Metrology, Proceedings of SPIE, vol. 3636, pp. 60-68, 1999.

Psaltis, et al. "Holographic Memories," Scientific American, Nov. 1995.

Shelby, "Media Requirements for Digital Holographic Data Storage," Holographic Data Storage, Section 1.3 (Coufal, Psaltis, Sincerbox Eds. 2003).

PCT/US07/81378 International Search Report and the Written Opinion of the International Searching Authority, or the Declaration, mailed May 7, 2008.

* cited by examiner

MINIATURE SINGLE ACTUATOR SCANNER FOR ANGLE MULTIPLEXING WITH CIRCULARIZING AND PITCH CORRECTION CAPABILITY

CROSS-REFERENCE TO RELATED APPLICATIONS

This application is a divisional of U.S. application Ser. No. 11/833,613, now U.S. Pat. No. 7,405,853, entitled "MINIATURE SINGLE ACTUATOR SCANNER FOR ANGLE MULTIPLEXING WITH CIRCULARIZING AND PITCH CORRECTION CAPABILITY," filed on Aug. 3, 2007, which claims the benefit of U.S. Provisional Application No. 60/835,108, entitled "MINIATURE SINGLE ACTUATOR SCANNER FOR ANGLE MULTIPLEXING WITH CIRCULARIZING AND ORTHOGONAL SCANNING CAPABILITY," filed Aug. 3, 2006. The entire disclosure and contents of the above patents and applications are hereby incorporated by reference.

STATEMENT OF JOINT RESEARCH AGREEMENT

In compliance with 37 C.F.R. §1.71(g) (1), disclosure is herein made that the claimed invention was made pursuant to a Joint Research Agreement as defined in 35 U.S.C. 103 (c) (3), that was in effect on or before the date the claimed invention was made, and as a result of activities undertaken within the scope of the Joint Research Agreement, by or on the behalf of Nintendo Co., Ltd. and InPhase Technologies, Inc.

BACKGROUND

1. Field of the Invention

The present invention broadly relates to a device comprising a scanner which may be used in, for example, angle multiplexing of holographic data to carry out a stationary optical center of rotation (OCR) scan. The present invention also broadly relates to a device comprising a scanner which may use a single reflective prism for circularizing a scanning beam, for carrying out a stationary OCR scan and/or for carrying out an orthogonal scan for pitch control. The present invention further broadly relates to a device comprising a flexure assembly and a reflective component suspension assembly for use in such scanners.

2. Related Art

Developers of information storage devices and methods continue to seek increased storage capacity. As part of this development, holographic memory systems have been suggested as alternatives to conventional memory devices. Holographic memory systems may be designed to record data as one bit of information (i.e., bit-wise data storage). See McLeod et al. "Micro-Holographic Multi-Layer Optical Disk Data Storage," *International Symposium on Optical Memory and Optical Data Storage* (July 2005). Holographic memory systems may also be designed to record an array of data that may be a 1-dimensional linear array (i.e., a 1×N array, where N is the number linear data bits), or a 2-dimensional array commonly referred to as a "page-wise" memory system. Page-wise memory systems may involve the storage and readout of an entire two-dimensional representation, e.g., a page of data. Typically, recording light passes through a two-dimensional array of low and high transparency areas representing data, and the system stores, in three dimensions, the pages of data holographically as patterns of varying refractive index imprinted into a storage medium. See Psaltis et al., "Holographic Memories," *Scientific American*, November 1995, where holographic systems are discussed generally, including page-wise memory systems.

Holographic data storage systems may perform a data write (also referred to as a data record or data store operation, simply "write" operation herein) by combining two coherent light beams, such as laser beams, at a particular point within the storage medium. Specifically, a data-encoded light beam may be combined with a reference light beam to create an interference pattern in the holographic storage medium. The pattern created by the interference of the data beam and the reference beam forms a hologram which may then be recorded in the holographic medium. If the data-bearing beam is encoded by passing the data beam through, for example, a spatial light modulator (SLM), the hologram(s) may be recorded in the holographic medium.

Holographically-stored data may then be retrieved from the holographic data storage system by performing a read (or reconstruction) of the stored data. The read operation may be performed by projecting a reconstruction or probe beam into the storage medium at the same angle, wavelength, phase, position, etc., as the reference beam used to record the data, or compensated equivalents thereof. The hologram and the reference beam interact to reconstruct the data beam.

A technique for increasing data storage capacity is by multiplexing holograms. Multiplexing holograms involves storing multiple holograms in the holographic storage medium, often in the same volume or nearly the same volume of the medium. Multiplexing may carried out by varying an angle, wavelength, phase code, etc., in recording and then later reading out the recorded holograms. Many of these methods rely on a holographic phenomenon known as the Bragg effect to separate the holograms even though they are physically located within the same volume of media. Other multiplexing methods such as shift and, to some extent correlation, use the Bragg effect and relative motion of the media and input laser beams to overlap multiple holograms in the same volume of the media.

In angle multiplexing, multiple holograms may be stored in the same volume of the holographic storage medium by varying the angle of the reference beam during recording. For example, data pages may be recorded in the holographic storage medium at many angles, exhausting the dynamic range or "address space" of a given volume of the medium. Each location in the "address space" (or each data page) corresponds to the angle of a reference beam. During recording, the reference beam scans through many discrete angles as data pages are written. Conversely, during readout, a conjugate reference beam (sometimes referred to as a "probe beam") may probe each data page at its corresponding angle. In other words, the scanner may be used for either recording or readout of the data pages.

SUMMARY

According to a first broad aspect of the present invention, there is provided a device comprising a scanner having a mechanical center of rotation and an optical center of rotation, the scanner comprising:

a reflector component for reflecting an input scanning beam to provide an output scanning beam;

means supporting the reflector component for pivoting about one end of the reflector component with respect to the mechanical center of rotation so that the output scanning beam provides a scan which is stationary with respect to the optical center of rotation;

means for enabling the support means to provide controlled pivoting of the reflector component about the one end;
a magnet component which when actuated causes pivoting of the reflector component about the one end; and
means for actuating the magnet component to thereby cause pivoting of the reflector component about the one end.

According to a second broad aspect of the invention, there is provided a device comprising a scanner having a mechanical center of rotation axis, an optical center of rotation, and a pitch axis orthogonal to the mechanical center of rotation axis, the scanner comprising:
a reflective prism for circularizing an elliptical input scanning beam to provide a circularized output scanning beam;
a prism carrier and magnet suspension assembly from which the reflective prism is mounted;
flexure means connected to the carrier and suspension assembly for enabling the reflective prism to controllably pivot:
at one end of the reflective prism with respect to the mechanical center of rotation axis so to that the output scanning beam provides a scan which is stationary with respect to the optical center of rotation; and
with respect to the pitch axis so that the output scanning beam provides an orthogonal scan;
a magnet component which, when actuated, causes the reflective prism to controllably pivot with respect to one or more of the mechanical center of rotation axis and the pitch axis; and
means for actuating the magnet component to thereby cause the reflective prism to controllably pivot with respect to one or more of the mechanical center of rotation axis and the pitch axis.

According to a third broad aspect of the invention, there is provided a device comprising a flexure assembly and a reflective component suspension assembly connected to the flexure assembly, the flexure assembly comprising:
a pair of spaced apart upper flexure components which enable the suspension assembly to controllably pivot with respect to a stationary mechanical center of rotation axis;
each of the upper flexure components having a lower base segment, an upper segment, and at least one flexure segment diagonally connecting the lower base segment of the upper flexure component to the upper segment of the upper flexure component; and
a pair of spaced apart lower flexure components which enable the suspension assembly to controllably pivot with respect to an axis orthogonal to the mechanical center rotation axis;
one of the lower flexure components being mounted underneath one of the upper flexure components, the other of the lower flexure components being mounted underneath the other of the upper flexure components;
each of the lower flexure components having a lower base segment, an upper segment, and at least one flexure segment extending diagonally and outwardly with respect to the orthogonal axis, and connecting the lower base segment of the lower flexure component to the upper segment of the lower flexure component.

BRIEF DESCRIPTION OF THE DRAWINGS

The invention will be described in conjunction with the accompanying drawings, in which.

DETAILED DESCRIPTION

Figure 1:
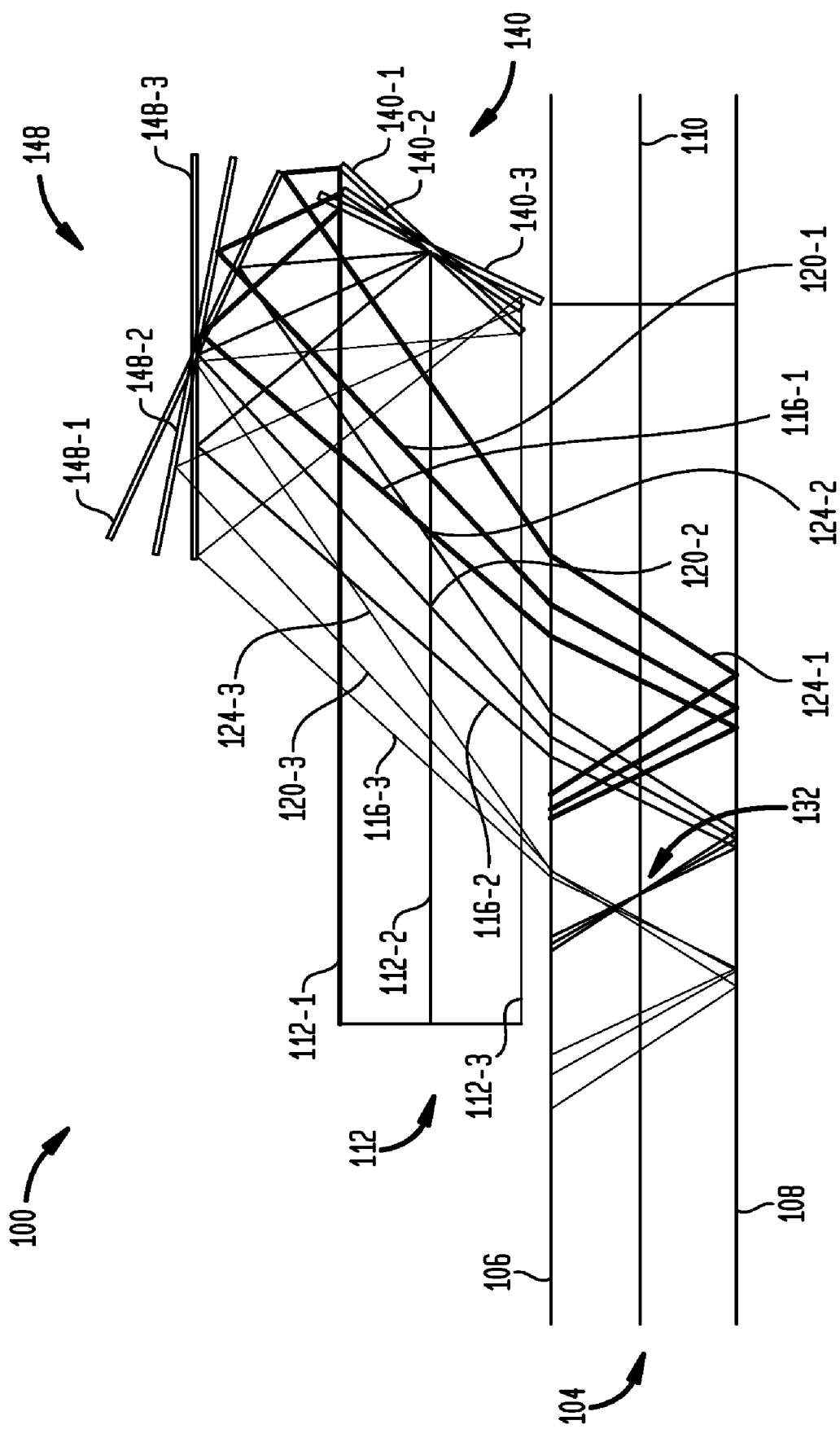
FIG. 1 represents schematically an illustrative readout scanning carried out using a conventional galvo scanner (as the readout scanner) of data recorded in a holographic storage medium by angle multiplexing.

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, directional terms such as "top", "bottom", "above", "below", "left", "right", "horizontal", "vertical", "up", "down", etc. are merely used for convenience in describing the various embodiments of the present invention. The embodiments of the present invention may be oriented in various ways. For example, the embodiments shown in FIGS. 1 through 13 may be flipped over, rotated by 90° in any direction, etc.

For the purposes of the present invention, the term "laser" refers to conventional lasers, as well as laser diodes (LDs).

For the purposes of the present invention, the term "light source" refers to any source of electromagnetic radiation of any wavelength, for example, from a laser, etc. Suitable light sources for use in embodiments of the present invention include, but are not limited to, those obtained by conventional laser sources, e.g. the blue and green lines of $Ar^+$ (458, 488, 514 nm) and He—Cd lasers (442 nm), the green line of frequency doubled YAG lasers (532 nm), and the red lines of He—Ne (633 nm), $Kr^+$ lasers (647 and 676 nm), and various laser diodes (LDs) (e.g., emitting light having wavelengths of from 290 to 900 nm).

For the purposes of the present invention, the term "spatial light intensity" refers to a light intensity distribution or pattern of varying light intensity within a given volume of space.

For the purposes of the present invention, the terms "holographic grating," "holograph" or "hologram" (collectively and interchangeably referred to hereafter as "hologram") are used in the conventional sense of referring to an interference pattern formed when a signal beam and a reference beam interfere with each other. In cases wherein digital data is recorded, the signal beam may be encoded with a data modulator, e.g., a spatial light modulator, etc.

For the purposes of the present invention, the term "holographic recording" refers to the act of recording a hologram in a holographic storage medium. The holographic recording may provide bit-wise storage (i.e., recording of one bit of data), may provide storage of a 1-dimensional linear array of data (i.e., a 1×N array, where N is the number linear data bits), or may provide 2-dimensional storage of a page of data.

For the purposes of the present invention, the term "multiplexing holograms" refers to recording, storing, etc., a plurality of holograms in the same volume or nearly the same volume of the holographic storage medium by varying a recording parameter(s) including, but not limited to, angle, wavelength, phase code, shift, correlation, peristrophic, etc. For example, angle multiplexing involves varying the angle of the reference beam during recording to store a plurality of holograms in the same volume. The multiplexed holograms that are recorded, stored, etc., may be read, retrieved, reconstructed, etc., by using the same recording parameter(s) used to record, store, etc., the respective holograms.

For the purposes of the present invention, the term "holographic storage medium" refers to a component, material, etc., that is capable of recording and storing, in three dimensions (i.e., the X, Y and Z dimensions), one or more holograms as one or more pages as patterns of varying refractive index imprinted into the medium. Examples of holographic media useful herein include, but are not limited to, those described in: U.S. Pat. No. 6,103,454 (Dhar et al.), issued Aug. 15, 2000; U.S. Pat. No. 6,482,551 (Dhar et al.), issued Nov. 19, 2002; U.S. Pat. No. 6,650,447 (Curtis et al.), issued Nov. 18, 2003, U.S. Pat. No. 6,743,552 (Setthachayanon et al.), issued Jun. 1, 2004; U.S. Pat. No. 6,765,061 (Dhar et al.), Jul. 20, 2004; U.S. Pat. No. 6,780,546 (Trentler et al.), issued Aug. 24, 2004; U.S. Patent Application No. 2003-0206320 (Cole et al), published Nov. 6, 2003, and U.S. Patent Application No. 2004-0027625 (Trentler et al.), published Feb. 12, 2004, the entire contents and disclosures of which are herein incorporated by reference.

For the purposes of the present invention, the term "data page" or "page" refers to the conventional meaning of data page as used with respect to holography. For example, a data page may be a page of data (i.e., a two-dimensional assembly of data), one or more pictures, etc., to be recorded in a holographic storage medium.

For the purposes of the present invention, the term "recording light" refers to a light source used to record into a holographic storage medium. The spatial light intensity pattern of the recording light is what is recorded.

For the purposes of the present invention, the term "recording data" refers to storing or writing holographic data in a holographic storage medium.

For the purposes of the present invention, the term "reading data" refers to retrieving, recovering, or reconstructing holographic data stored in a holographic storage medium.

For the purposes of the present invention, the term "X-Y plane" typically refers to the plane defined by holographic medium that encompasses the X and Y linear directions or dimensions. The X and Y linear directions or dimensions are typically referred to herein, respectively, as the dimensions known as length (i.e., the X-dimension) and width (i.e., the Y-dimension).

For the purposes of the present invention, the terms "Z-direction" and "Z-dimension" refer interchangeably to the linear dimension or direction perpendicular to the X-Y plane, and is typically referred to herein as the linear dimension known as thickness.

For the purposes of the present invention, the term "data modulator" refers to any device that is capable of optically representing data in one or two-dimensions from a signal beam.

For the purposes of the present invention, the term "spatial light modulator" (SLM) refers to a data modulator device that is an electronically controlled, active optical element.

For the purposes of the present invention, the term "refractive index profile" refers to a three-dimensional (X, Y, Z) mapping of the refractive index pattern recorded in a holographic storage medium.

For the purposes of the present invention, the term "data beam" refers to a recording beam containing a data signal. As used herein, the term "data modulated beam" refers to a data beam that has been modulated by a modulator such as a spatial light modulator (SLM).

For the purposes of the present invention, the terms "dynamic range" or "M#" relate to an intrinsic property of a holographic medium and are used in the conventional sense to refer to the total response of that medium when portioned among the one or more holograms recorded in a common volume and related to the index change and thickness of that medium. See Shelby, "Media Requirements for Digital Holographic Data Storage," *Holographic Data Storage*, Section 1.3 (Coufal, Psaltis, Sincerbox Eds. 2003).

For the purposes of the present invention, the term "transmission" refers to transmission of a light beam from one component, element, article, etc., to another component, element, article, etc.

For the purposes of the present invention, the term "scanner" refers to a steering device for a light beam used to read, analyze, etc., images recorded in a holographic storage medium.

For the purposes of the present invention, the term "OCR" refers to or represents the optical center of rotation. In some embodiments, the OCR may correspond to the center of the scan rotation, the center of the hologram volume, or both the center of the scan rotation and the center of the hologram volume.

For the purposes of the present invention, the term "stationary OCR" refers to where all scan angles have a common intersection point in a hologram or holographic storage medium. For example, a stationary OCR scan may refer to a scan motion or movement where all scan angles intersect at a common point.

For the purposes of the present invention, the term "MCR" refers to or represents the mechanical center of rotation. The MCR may define one axis about which one corner or end of a reflector component (e.g., a prism) may rotate or pivot, even though the one corner or end of the reflector component is not necessarily coincident with or the same as the MCR. For example, the one corner or end of the reflector component may be coincident with or close to the MCR, but may also be located or positioned at some location which is further away from the MCR. In some embodiments, the MCR may define a single axis which the one corner or end of the reflector component is required to rotate or pivot about or with respect to so as to provide a stationary OCR.

Figure 2:
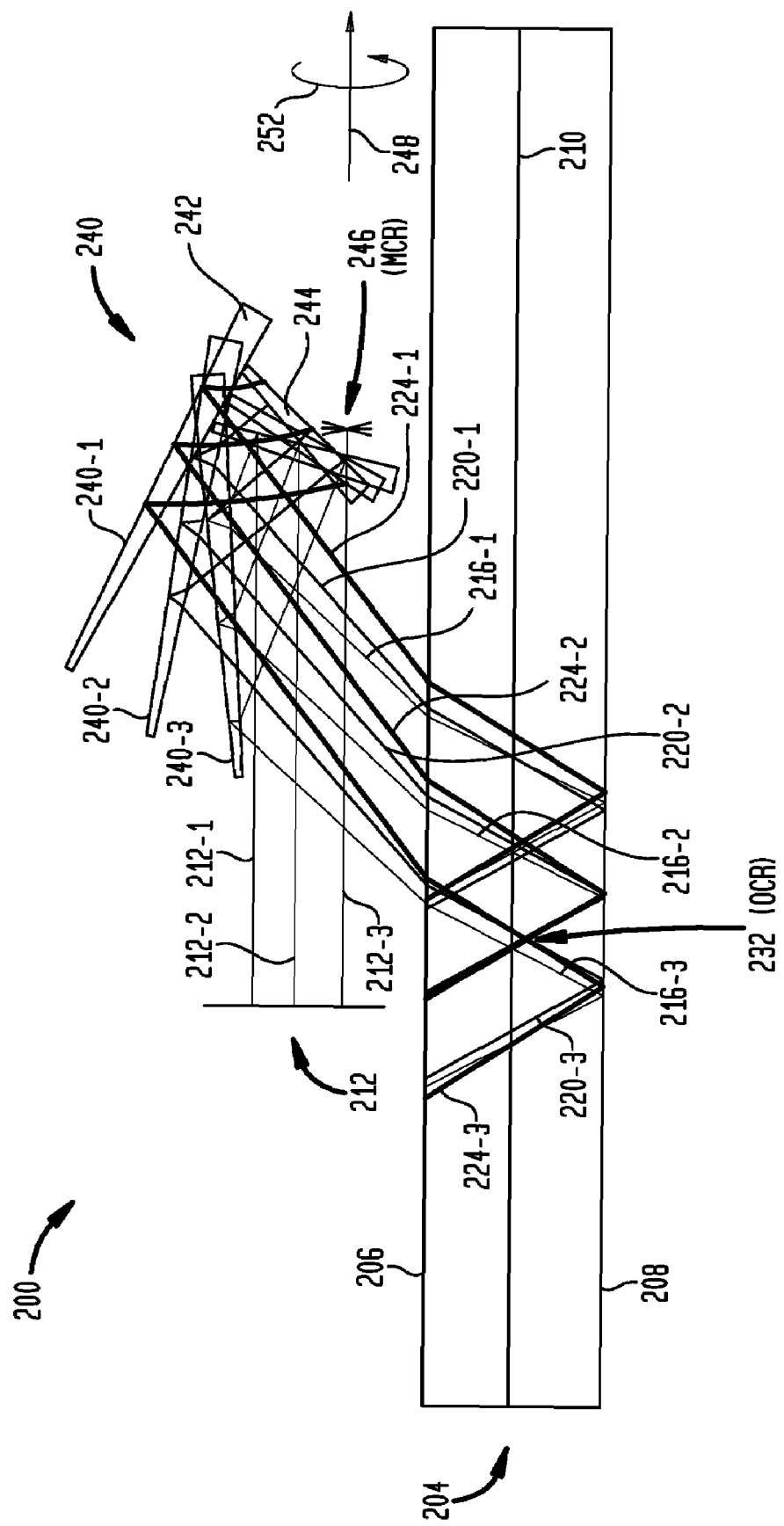
FIG. 2 schematically illustrates a single actuator scanner system that may perform identically to the conventional two-axis galvo scanner illustrated in FIG. 1.

For the purposes of the present invention, the term "PA" refers to or represents the pitch axis. The PA is a mechanical axis of rotation or pivoting which is orthogonal to the axis of the MCR, but which places the OCR near the center of the holographic medium. For example, FIG. 2 shows a PA indicated as 248.

For the purposes of the present invention, the term "orthogonal scanning" refers to a scan carried out by rotation or pivoting of the reflective component (e.g., prism) of the scanner about the PA. In some embodiments, orthogonal scanning about the PA may be used to carry out an orthogonal scan. Orthogonal scans may be performed in conjunction with scans (e.g., stationary OCR scans) carried out by rotating or pivoting of the reflector component relative to the MCR axis. These orthogonal scans may be very small in magnitude (e.g., the reflector component may be rotated or pivoted about the PA only up to about 0.5° in either direction) and are often used to provide pitch control to compensate for small errors in the tilt or positioning of the hologram or holographic storage medium.

For the purposes of the present invention, the term "anamorphic prism" refers to a prism design used in beam shaping that causes intentional distortion of a beam image. For example, an anamorphic prism may be used to change the shape of an elliptical light beam by, in effect, "stretching" the beam along the shorter dimension to provide a more circular-shaped beam.

For the purposes of the present invention, the term "Littrow prism" refers to a type of anamorphic prism.

For the purposes of the present invention, the term "circularization" refers to a beam conditioning process wherein an elliptical beam (e.g., an elliptical-shaped output beam from a laser diode) may be made into, converted to, etc., a circular-shaped beam.

For the purposes of the present invention, the term "in phase sinusoids" refers to sinusoidal voltage or current traces (for example, as seen on an oscilloscope) which have coincident peaks and valleys.

For the purposes of the present invention, the term "degrees of freedom" refers to the number of constraints required to describe a motion or movement mechanically, optically, or mathematically.

For the purposes of the present invention, the term "two degrees of freedom" refers to systems, devices, etc., having two constraints.

For the purposes of the present invention, the term "translate" refers to lateral or linear motion or movement along a linear longitudinal axis.

For the purposes of the present invention, the term "rotary galvo actuator" refers to galvanometer, e.g., a mirror which is rotated, pivoted, etc., by a motor, such as, for example, an electric motor.

For the purposes of the present invention, the term "master galvo" refers to a galvo assigned to an independent variable of a two degree of freedom constraint equation.

For the purposes of the present invention, the term "slave galvo" refers to a galvo assigned to a dependent variable of a two degree of freedom constraint equation.

For the purposes of the present invention, the term "control rule" refers to a two degree of freedom constraint equation.

For the purposes of the present invention, the terms "motion" or "movement" refer interchangeably to any form of motion or movement, for example, linear movement, rotational movement, pivotal movement, etc.

For the purposes of the present invention, the term "actuator" refers to a device that causes a magnet component to impart motion, movement, etc. Suitable actuators may include, solenoids (e.g. voice coils), stepper motors, etc.

For the purposes of the present invention, the term "voice coil" refers to a solenoid-type actuator.

For the purposes of the present invention, the term "Cardan suspension" refers to a joint, linkage, connection, etc., between two other components, for example, two rigid rods, which allows or enables the components (e.g., rigid rods) which are joined, linked, connected, etc., to bend, pivot, in any direction, relative to the joint, linkage, connection, etc. A Cardan suspension may also be referred to as a "universal joint," U-joint, Cardan joint, Hardy-Spicer joint, Hooks's joint, etc. One example of a Cardan suspension may comprise a pair of hinges joined, linked, connected to each other, or located close together, but where the hinges are joined, linked, connected, oriented, etc., such that the respective pivot, rotational, etc., axes of the hinges are orthogonal (perpendicular) to each other.

For the purposes of the present invention, the term "gimbal" refers to a mechanical device, means, mechanism, suspension, etc., that allows or enables the pivoting, rotation, etc., of an object in multiple dimensions. A gimbal may be made up of two or three pairs of pivots mounted, connected, linked, joined, etc., on axes at right angles (i.e., orthogonally or perpendicularly). For example, a three-axis gimbal may allow or enable a mounted object to remain in a horizontal plane regardless of the motion of its support. An example of a two-axis gimbal is a Cardan suspension.

For the purposes of the present invention, the term "area sensor" refers to a sensor having a plurality of light-sensitive receptor sites, e.g. "pixels", arranged in a two-dimensional array and may be useful for detecting, capturing, etc., holograms recovered from a holographic storage medium. Area sensors often provide an electrical output signal that represents a two-dimensional image of the illumination falling on its light-sensitive surface, e.g. convert captured images to digital data for processing by system electronics. Area sensors may be referred to interchangeably herein as "cameras" and may include complementary metal-oxide-semiconductor (CMOS) sensors, charge-coupled CCD sensors components, etc.

Description

FIG. 1 represents an illustrative readout scanning carried out using a conventional galvo scanner (as the readout scanner), indicated generally as 100, of data recorded in the holographic storage medium by angle multiplexing. Readout scanner 100 is shown with a holographic storage medium 104 which has an upper surface 106, a reflective backing 108 to facilitate miniaturization, and a midpoint 110. The incoming readout reference beam 112 is represented by three beam lines corresponding to the top of the beam (beam line 112-1), middle of the beam (beam line 112-2), and the bottom of the beam (beam line 112-3). Scan 116 (see beam lines 116-1, 116-2 and 116-3) represents the start angle, scan 120 (see beam lines 120-1, 120-2 and 120-3) the middle angle, and scan 124 (see beam lines 124-1, 124-2 and 124-3) the end angle of the dynamic range. The optical center of rotation ("OCR") is indicated by arrow 132. Also shown in FIG. 1 is a first mirror 140 which may be adjusted or pivoted to different angles (e.g. represented by positions 140-1, 140-2 and 140-3), and a second mirror 148 which may also be adjusted or pivoted to different angles (e.g., represented by positions 148-1, 148-2 and 148-3). Beam lines 116-1, 116-2 and 116-3 represent the respective reflections of top 112-1, middle 112-2 and bottom 112-3 of beam 112 when the first and second mirrors 140 and 148 are at positions 140-3 and 148-3.

Similarly beam lines 120-1, 120-2 and 120-3 represent the respective reflections of top 112-1, middle 112-2 and bottom 112-3 of beam 112 when the first and second mirrors 140 and 148 are at positions 140-2 and 148-2, while beam lines 124-1, 124-2 and 124-3 represent the respective reflections of top 112-1, middle 112-2 and bottom 112-3 of beam 112 when the first and second mirrors 140 and 148 are at positions 140-1 and 148-1. As further shown in FIG. 1, OCR 132 represents, at the intersection of midpoint 110 and beam lines 116-2, 120-2 and 124-2, both the center of the reference beam rotation, as well as the center of the hologram volume, by readout scanner 100.

Recording scanners that have a stationary OCR at the hologram centroid minimize the size of each non-overlapping recording location and thus make best use of the dynamic range of the holographic storage medium. During readout such scanners may minimize cross-talk from holograms at different addresses. Scanners with a stationary OCR also minimize the required size of the reference beam and thus minimize power required for a given energy density. In order to keep the OCR stationary during the scan of data recorded in a holographic storage medium by angle multiplexing, the probe (scanning) beam used in the scanning should have two degrees of freedom, e.g., should be able to rotate or pivot, as well as translate. Such rotation/pivoting and translation of the scanning beam requires two degrees of freedom, for example, such as may be provided by two rotary galvo actuators. But these two degrees of freedom are not independent in these two rotary galvo actuators, in that the angle of the "slave galvo" may be constrained to the angle of the "master galvo" through the use of a control rule that is sufficient to keep the OCR stationary.

FIG. 2 illustrates a scanning system, indicated generally as 200, using a single actuator scanner that may perform identically to the conventional two-axis galvo scanner of FIG. 1. The single actuator scanner system 200 is shown in FIG. 2 with a holographic storage medium 204 which has an upper surface 206, a reflective backing 208 to facilitate miniaturization, and a midpoint 210. The incoming input readout beam 212 is represented by three beam lines corresponding to the top of the beam (beam line 212-1), the middle of the beam (beam line 212-2), and the bottom of the beam (beam line 212-3). Scan 216 (see beam lines 216-1, 216-2 and 216-3) represents the start angle, scan 220 (see beam lines 220-1, 220-2 and 220-3) the middle angle, and scan 224 (see beam lines 224-1, 224-2 and 224-3) the end angle of the dynamic range. The OCR of scanner system 200 is indicated by arrow 232. Also shown in FIG. 2 is a reflector 240 comprising a first prism 242 and a second prism 244 which are fixed with respect to one another and which rotate or pivot about or with respect to the MCR, which is indicated as 246. Reflector 240 may be adjusted or pivoted about MCR 246 to different angles (e.g., represented by positions 240-1, 240-2 and 240-3). Beam lines 216-1, 216-2 and 216-3 represent the respective reflections of top 212-1, middle 212-2 and bottom 212-3 of beam 212 when reflector 240 is at position 240-3. Similarly beam lines 220-1, 220-2 and 220-3 represent the respective reflections of top 212-1, middle 212-2 and bottom 212-3 of beam 212 when reflector 240 is at position 240-2, while beam lines 224-1, 224-2 and 224-3 represent the respective reflections of top 212-1, middle 212-2 and bottom 212-3 of beam 212 when reflector 240 is at position 240-1.

As further shown in FIG. 2, OCR 232 represents, at the intersection of midpoint 210 and beam lines 216-2, 220-2 and 224-2, both the center of the output readout beam rotation, as well as the center of the hologram volume, of readout scanner 200. MCR 246 represents the single axis of rotation required to give a stationary OCR scan when using a conventional scanner, such as that shown in FIG. 1. Scanner system 200 may also circularize an elliptical laser diode beam (i.e., circularize an elliptical-shaped beam), may do orthogonal scanning to provide pitch control, may lend itself to simple construction and control, etc. Only a single actuator for rotating or pivoting reflector 240 is required because the degrees of freedom conventionally governed by a second actuator and control rule are constrained optically. In particular, each of mirrors 140 and 148 of the conventional scanner 100 shown in FIG. 1 has been replaced with a reflective prism (e.g., prisms 242 and 244 which comprise reflector 240) that may be, for example, silvered on its intermediate or backside. Incoming light refracts, reflects, and then refracts again for each of prisms 242 and 244 of reflector 240. Because prisms 242 and 244 are fixed with respect to one another in reflector 240 which rotates or pivots about MCR 246, extra degrees of freedom are provided that allow for a stationary OCR 232, as well as control of the location of MCR 246, e.g., reflector 240 may be shifted, at or with respect to MCR 246, vertically and horizontally while keeping OCR 232 fixed and stationary.

It may also be advantageous for orthogonal scanning to locate MCR 246 in-line with the incoming readout beam, as represented by the pitch axis ("PA"), indicated by 248 in FIG. 2, with orthogonal scanning being carried out by rotation or pivoting of reflector 240 about PA 248, as indicated by circular arrow 252 to provide pitch control. This orthogonal scan about PA 248 is primarily used to provide pitch control to compensate for any small errors in the tilt or position of the hologram or holographic storage medium 204 (i.e., where the plane defined by surface 206 of medium 204 is not substantially parallel with MCR axis 246). Accordingly, the rotation or pivoting of reflector component 240 about or with respect to PA 248 to carry out such orthogonal scans may be relatively small in magnitude, and may require rotation or pivoting of reflector component 240 about or with respect to PA 248 of, for example, only about 0.5° in either direction and relative to the plane defined by surface 206, as indicated by circular arrow 252. Orthogonal scanning, as illustrated in FIG. 2, may be carried out separately from stationary OCR scanning (i.e., with respect to MCR axis 246), or may be carried out concurrently with stationary OCR scanning. In order to keep the OCR relatively stationary in the orthogonal direction it may be necessary in some embodiments to make sure the PA axis (e.g., PA 248 in FIG. 2) is near or close to OCR and the incoming readout beam.

Figure 4:
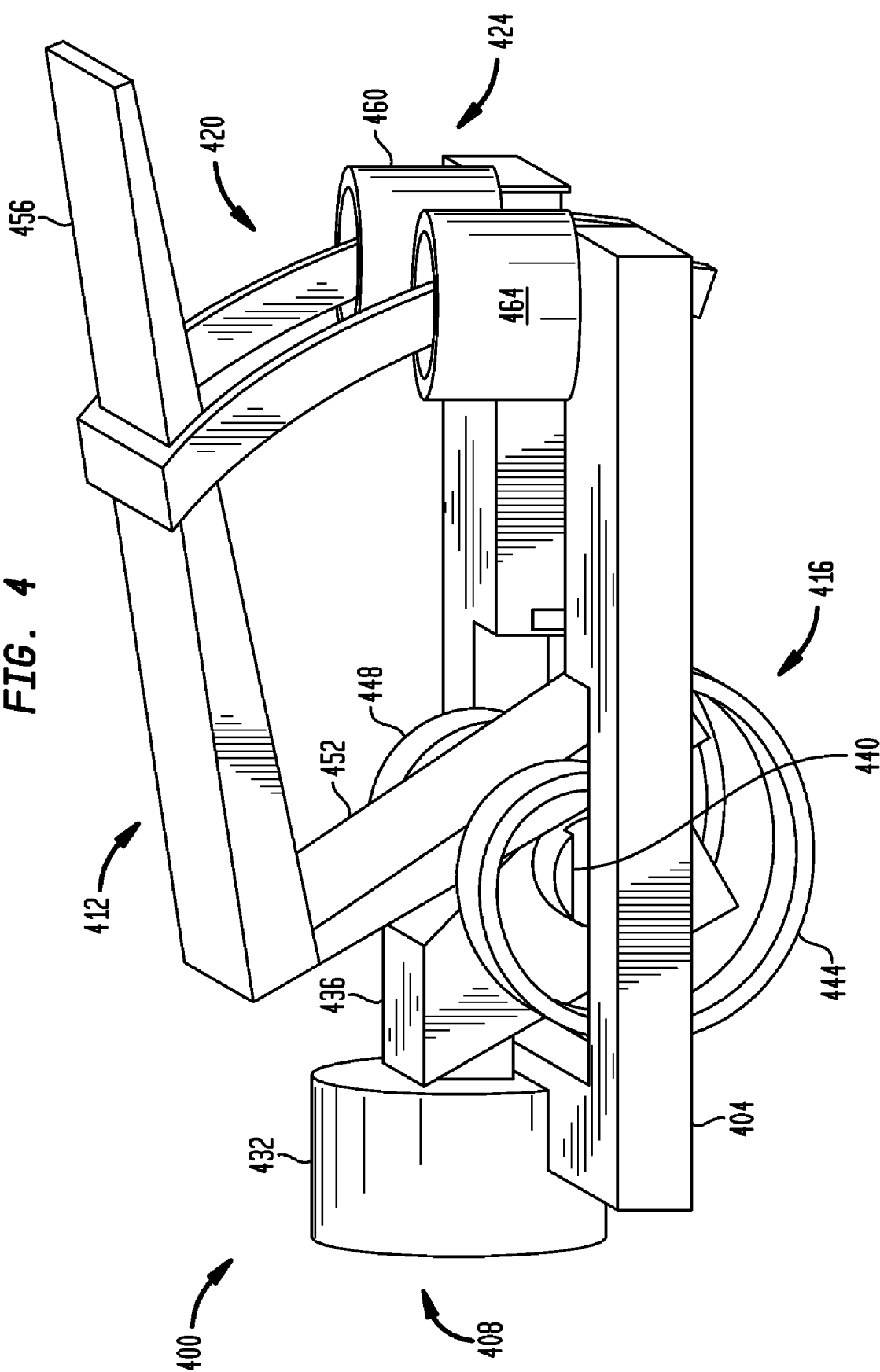
FIG. 4 represents a perspective view of an embodiment of a stationary OCR scanner according to the present invention.
Figure 5:
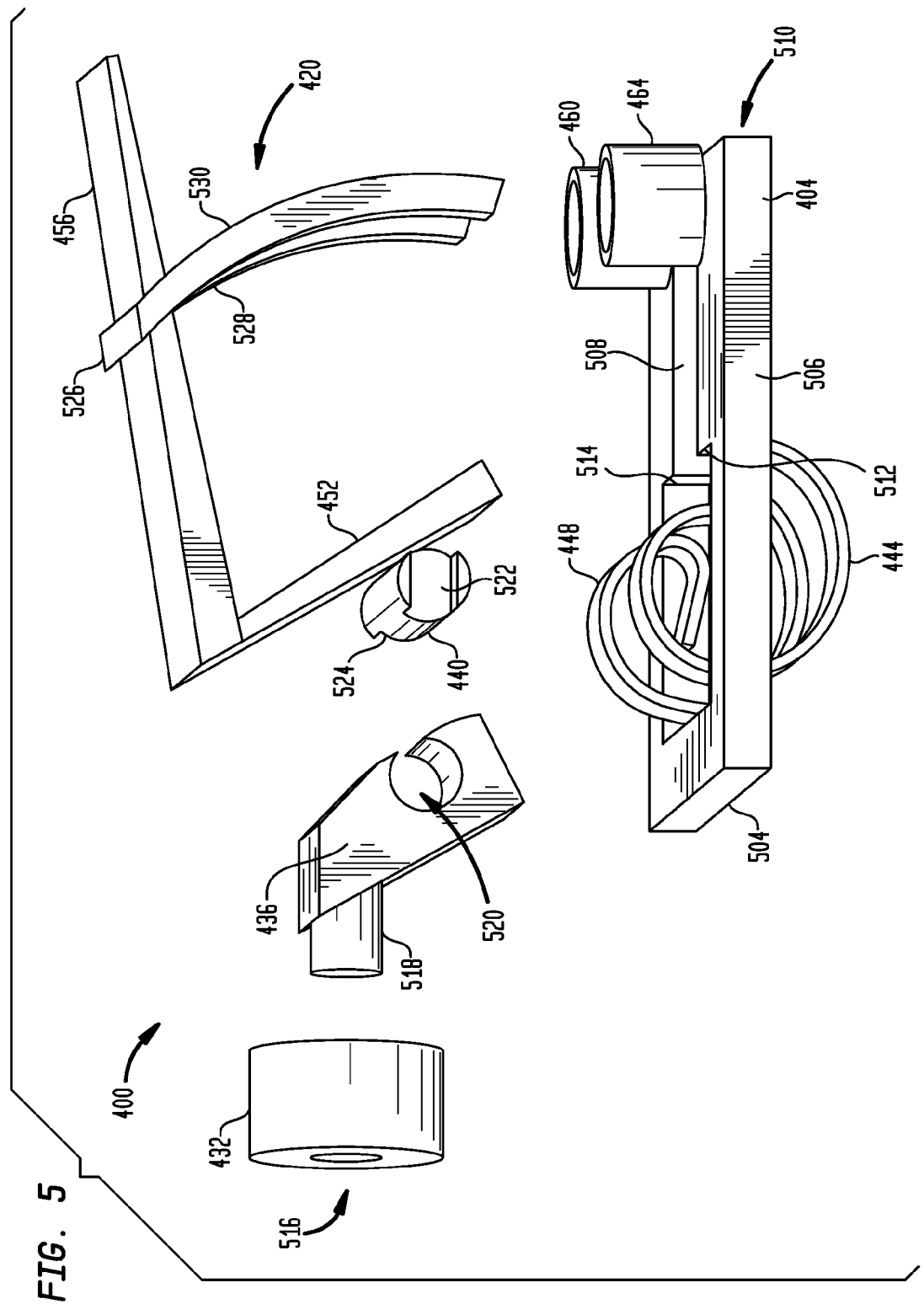
FIG. 5 is an exploded view of the embodiment of the scanner of FIG. 4.

In addition, the elliptical-shaped beam from a laser diode may also be circularized by refraction through the use of two reflective anamorphic (e.g., Littrow) prisms in the reflector component, as illustrated in FIGS. 4 and 5 below. A 2x circularization of the beam (i.e., the shorter dimension of the elliptical-shaped beam from the laser diode is increased or stretched twice its original length, thus reaching or approaching a circular shape) may be achieved with this system although the prisms may also be modified for other aspect ratios. Such circularization may also be accomplished with a single anamorphic prism, as is illustrated in FIGS. 7 and 8 and 11 through 13, as described below.

Figure 3:
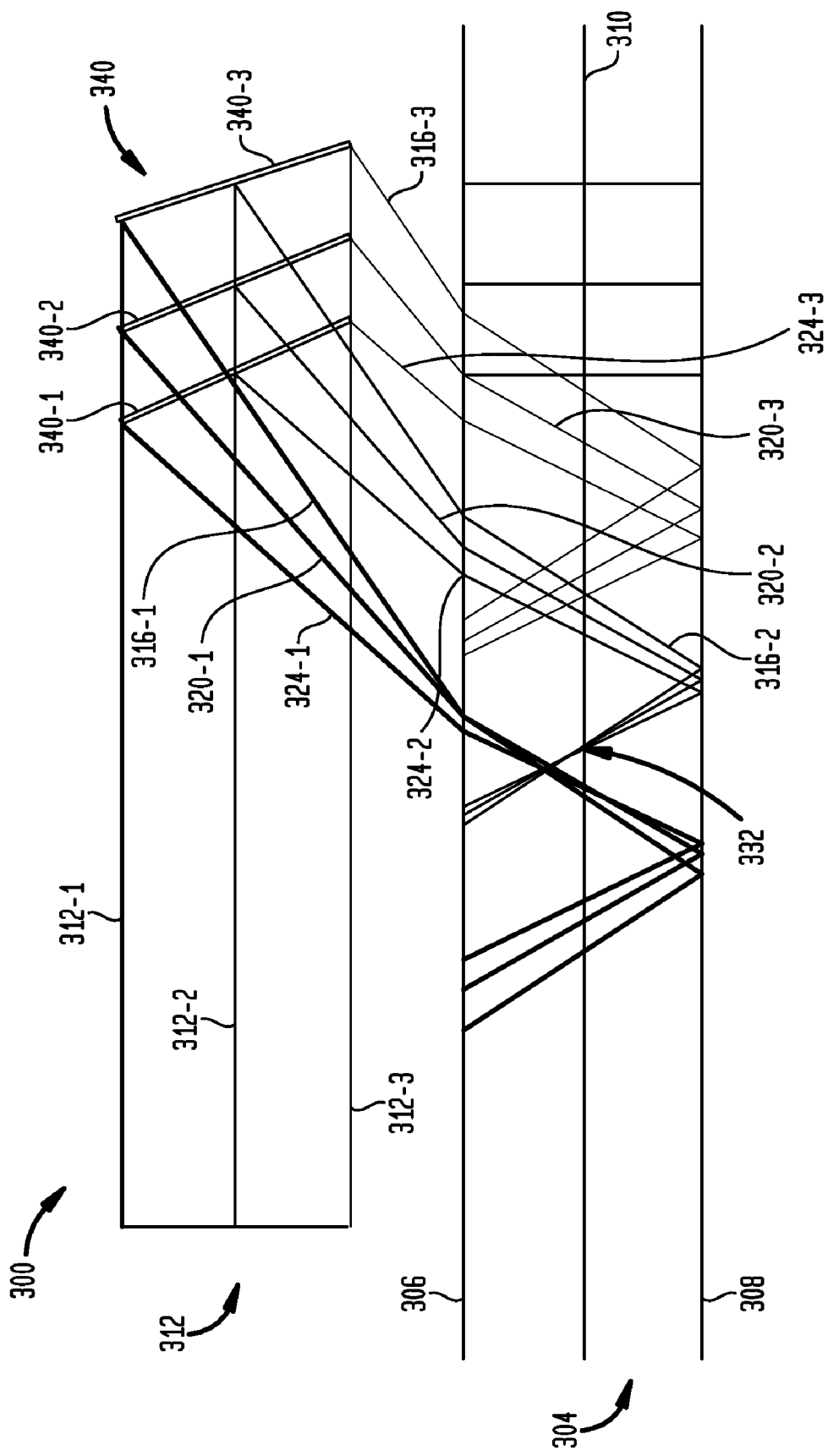
FIG. 3 schematically illustrates a readout scanning about a stationary optical center of rotation (OCR) using a single mirror with two actuators, one being a linear actuator, the other being a rotary actuator.

FIG. 3 schematically illustrates scanner system, indicated generally as 300, using a single scan mirror 340 that may both rotate/pivot and translate to enable stationary OCR scanning. An idealized scanner system 300 is shown in FIG. 3 with a holographic storage medium 304 which has an upper surface 306, a reflective backing 308 to facilitate miniaturization, and a midpoint 310. The incoming readout input beam 312 is represented by three positions corresponding to the top of the beam (beam line 312-1), the middle of the beam (beam line 312-2), and the bottom of the beam (beam line 312-3). Scan 316 (see beam lines 316-1, 316-2 and 316-3) represents the start angle, scan 320 (see beam lines 320-1, 320-2 and 320-3) the middle angle and scan 324 (see beam lines 324-1, 324-2 and 324-3) the end angle of the dynamic range. The optical center of rotation ("OCR") is indicated by arrow 332. As also shown in FIG. 3, mirror 340 may be adjusted or translated, for example, to three different angles (e.g., represented by positions 340-1, 340-2 and 340-3). Beam lines 316-1, 316-2 and 316-3 represent the respective reflections of top 312-1, middle 312-2 and bottom 312-3 of beam 312 when mirror 340 is at positions 340-3. Similarly beam lines 320-1, 320-2 and 320-3 represent the respective reflections of top 312-1, middle 312-2 and bottom 312-3 of beam 312 when mirror 340 is at position 340-2, while beam lines 324-1, 324-2 and 324-3 represent the respective reflections of top 312-1, middle 312-2 and bottom 312-3 of beam 312 when mirror 340 is at positions 340-1. As further shown in FIG. 3, the OCR 332 represents, at the intersection of midpoint 310 and beam lines 316-2, 320-2 and 324-2, both the center of the readout beam rotation, as well as the center of the hologram volume, of scanner 300.

An embodiment of a scanner device that meets one or more of these criteria is shown in FIGS. 4 and 5, and referred to generally as 400. Scanner 400 may comprise, for example, a generally U-shaped base member, indicated generally as 404, a suspension assembly, for example, a gimbal or Cardan suspension assembly, indicated generally as 408, a reflector component, indicated generally as 412, for reflecting (and which may also circularize) an input scanning beam from a laser, such as laser diode (not shown), to provide an output scanning beam and which is supported by suspension assembly 408 for rotation or pivoting, a spring assembly, indicated generally as 416, a magnet component, indicated generally as 420, and an actuator assembly, indicated generally as 424. Suspension assembly 408 may comprise an annular bearing, indicated as 432, a mount, indicated as 436, and an axle, indicated as 440, which also corresponds to the MCR axis with respect to which one end of reflector component 412 rotates or pivots. Spring assembly 416 may comprise a pair of spaced apart torsion springs, indicated, respectively, as 444 and 448. Reflector component 412 may comprise a first reflective prism, indicated as 452, and a second reflective prism, indicated as 456. Actuator assembly 424 may comprise a pair of voice coils, indicated, respectively, as 460 and 464.

Referring to FIG. 5, base member 404 may comprise a base segment, indicated as 504, and a pair of laterally spaced apart arms, indicated as 506 and 508, extending transversely from each end of base segment 504 towards the open end of base member 404, indicated as 510. Each arm 506 and 508 may have an inwardly extending shoulder or pocket, indicated respectively as 512 and 514, which receive and hold one end (not shown), respectively, of torsion springs 444 and 448. Bearing 432 may includes an axle mounting hole, indicated as 516, which is received by a generally cylindrical axle 518 of mount 436, and which also corresponds to the PA axis (i.e., is perpendicular to the MCR axis) about which reflector component 412 may rotate or pivot for orthogonal scanning to provide pitch control, and a generally cylindrical recess 520 for receiving axle 440. Axle 440 comprises a slot 522 and 524 at each end thereof, each of slots 522 and 524 receiving and holding the other end (not shown) of respective torsion spring 444 and 448. Magnet component 420 may comprise an upper prism-engaging segment 526 which engages prism 456, a pair of generally fang-shaped segments 528 and 530 extending from each end of upper segment 526 and curving downwardly therefrom.

Torsion springs 444 and 448 provide an opposing force or biasing to that imparted by the rotation or pivoting of suspension assembly 408 about both the MCR and PA axes defined by, respectively, axle 440 and axle 518, due to the movement of magnet 420 in response to the actuation of voice coils 460 and 460. This opposing or biasing force (preloading of motion) enables suspension assembly 408 to provide controlled rotation or pivoting of reflector component 412 about the MCR and PA axes. Prisms 452 and 456 are fixed with respect to one another as a combined rigid reflector component 412 by being connected to (e.g. glued to) axle 440 and prism-engaging segment 526 of magnet component 420. Surrounding the fang-shaped segments 528 and 530 are voice coils 460 and 464 which comprise actuator assembly 424.

As shown in FIGS. 4 and 5, voice coils 460 and 464, torsion springs 444 and 448, and bearing 432 are fixed attached, connected, etc., to base member 404. Magnet component 420 and voice coils 460 and 464 together form, in essence, a galvo or voice coil drive or actuator when energized by passing current through voice coils 460 and 464. For example, when voice coils 460 and 464 are actuated with in phase sinusoids, there is only rotation or pivoting about the MCR axis defined by axle 440 e.g., to carry out a stationary OCR scan. When voice coils 460 and 464 are, instead, actuated with sinusoids that are 180 degrees out of phase, there is only rotation or pivoting about the PA axis defined by axle 518, e.g., to carry out an orthogonal scan for pitch control. Diagonal scans (which include rotation or pivoting about the MCR and PA axis) may also be carried out when phase differences of the sinusoids in voice coils 460 and 464 are between 0 and 180 degrees. Such a phase-based scan direction may facilitate simple system control electronics for scanner 400.

Figure 6:
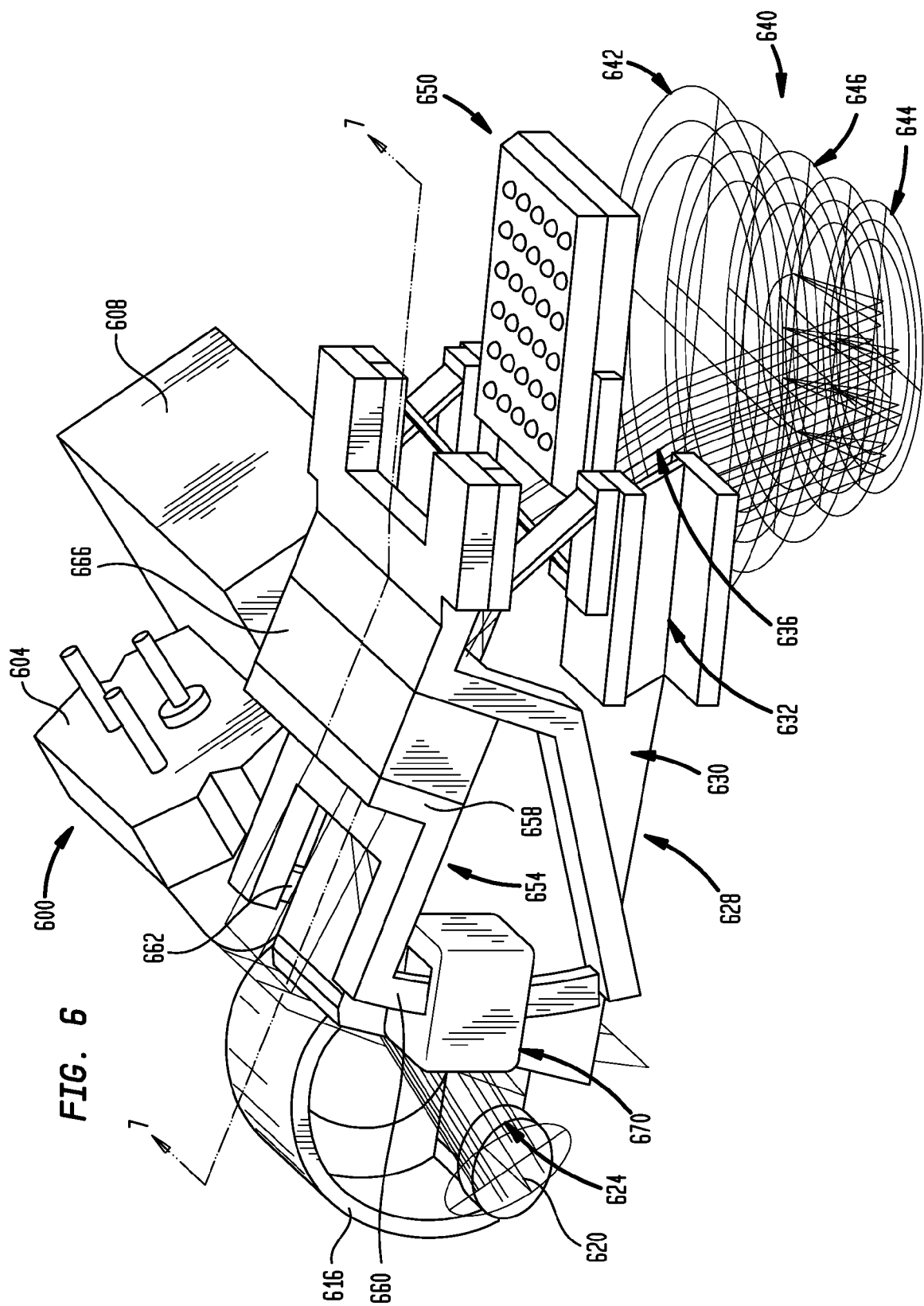
FIG. 6 represents a perspective view of an another embodiment of an integrated single-axis stationary OCR scanner according to the present invention using a single anamorphic reflective prism.
Figure 7:
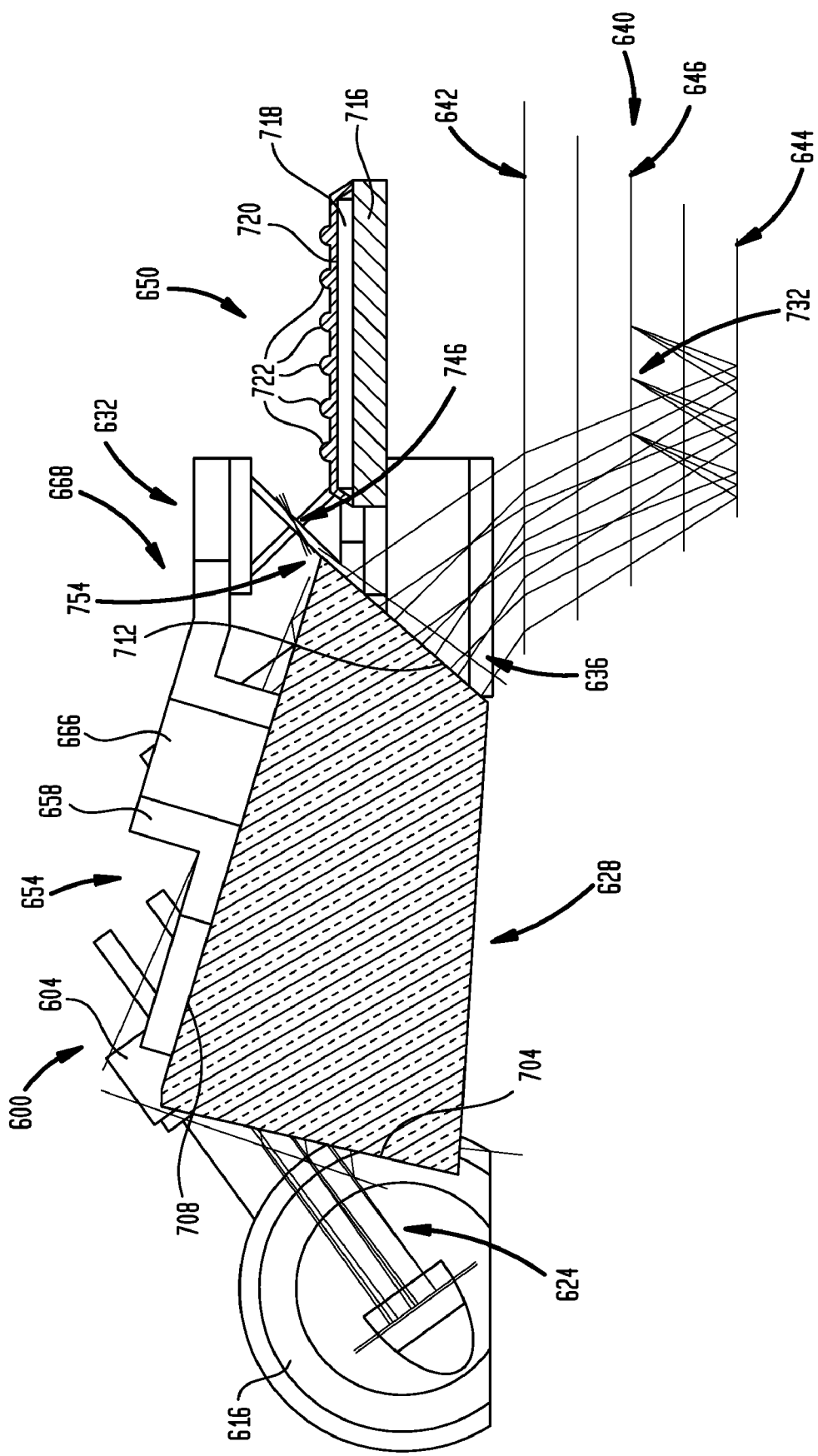
FIG. 7 is a sectional view of the scanner of FIG. 6 taken along line 7-7.
Figure 8:
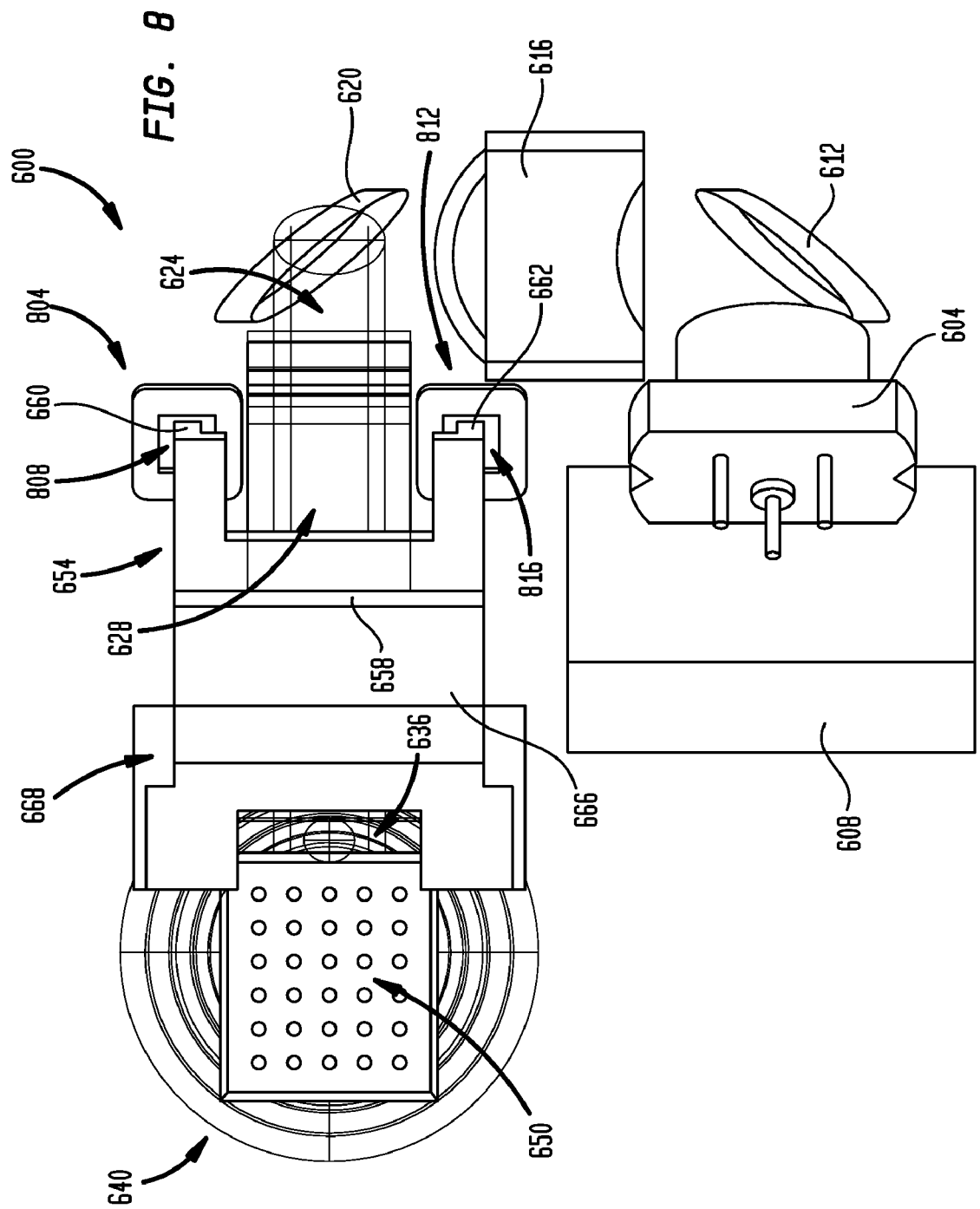
FIG. 8 is a top plan view of the scanner of FIG. 6.

Another embodiment of an integrated single-axis scanner device that uses a single prism (e.g., a single mirrored prism) is shown in FIGS. 6 through 8, and is referred to generally as 600. Scanner 600 includes a laser, for example, in the form of laser diode 604 which is positioned on laser diode mount 608. Scanner 600 further includes a first mirror 612 for relaying a light beam generated by laser diode 604, a collimation lens assembly, generally indicated as 616, for collimating the light beam relayed by mirror 612, and a second mirror 620 for relaying the collimated light beam from collimation lens assembly 616.

The collimated input scanning beam from mirror 620, which is indicated generally as 624, has an elliptical (i.e., non-circular) cross-sectional profile or shape. Input beam 624 is passed or transmitted through a reflector component in the form of anamorphic reflective prism 628 which is mounted from or carried by a prism carrier and magnet suspension assembly, indicated generally as 630, of scanner 600. Suspension assembly 630 is supported by or connected at one end to a flexure assembly, indicted generally as 632. (Flexure assembly 632, together with suspension assembly 630, of scanner 600 generally correspond to the combination of suspension assembly 408 and spring assembly 416 of scanner 400 of FIGS. 4 through 5 in providing constrained rotation or pivoting with respect to the orthogonal MCR and PA axes, as well as preloading of motion of the suspension assembly with respect to each of these axes.) Input beam 624 passes through prism 628, is refracted, then reflected, then refracted again (as further described below) to provide a collimated and circularized output scanning beam, indicated generally as 636. Output beam 636 reaches holographic storage medium 640, is refracted by upper surface 642, and is then reflected by reflective backing surface 644 of medium 640 towards midpoint 646 of medium 640.

As shown in FIG. 6, scanner 600 further comprises a generally rectangular-shaped area sensor (e.g., camera), indicated generally as 650, which is mounted at the forward end of scanner and over medium 640. Sensor 650 captures images of holograms recorded by medium 640 and converts the captured images to digital data for processing by system electronics (not shown). Suspension assembly 630 comprises rearward, magnetic flux transmitting section, indicated generally as 654, which includes a base segment 658, and a pair of generally fang-shaped segments, indicated as 660 and 662, with fang-shaped segment 660 curving downwardly from one end of base segment 628, and with fang-shaped segment 662 curving downwardly from the other end of base segment 628. A magnet 666 is mounted on or as part of assembly 630 and positioned between adjacent to base segment 658, and a forward magnetic flux transmitting section, indicated generally as 668. Rearward and forward magnetic flux transmitting sections 654 and 668 adjacent magnet 666 may comprise materials that only transmit the magnetic flux generated by magnet 666, or may comprise magnet or magnetized materials like those which comprise magnet 666. Scanner 600 further includes an actuator for magnet 666 in the form of, for example, a voice coil assembly indicated generally as 670, for causing assembly 630 (and thus prism 628) to rotate or pivot upwardly (or downwardly) about one or more of two orthogonal axes, as further described below.

Referring to FIG. 7, prism 628 includes a first refracting input face 704 which receives and refracts input beam 624, a second upper intermediate reflecting face 708 (e.g. by silvering the backside thereof), and a third refracting output face 712 which refracts and transmits output beam 636 towards upper surface 642 of medium 640. As further shown in FIG. 7, sensor 650 may comprise a lower CMOS sensor cover glass 716, an intermediate area sensor silicon chip 718 which includes a sensor active area and an upper CMOS sensor component 720. Sensor component 720 may have on the upper surface thereof a ball grid array 722 for electrical connections to system electronics (not shown). FIG. 7 also shows the optical center of rotation (OCR) of scanner 600, which is indicated as 732, and which also corresponds to the center of the scan rotation and the center of the hologram volume of medium 640. FIG. 7 further shows the mechanical center of rotation (MCR) axis, indicated as 746, as well as corner or end 754 of prism 628 closest to MCR axis 746 and about which prism 628 rotates or pivots with respect to MCR axis 746.

Referring to FIG. 8, assembly 670 comprises a voice coil 804 having a generally square-shaped bore, core, or center hole of coil 808 for receiving fang-shaped segment 660. Assembly 670 also comprises a voice coil 812 having a generally square-shaped bore, core, or center hole of coil 816 for receiving fang-shaped segment 662. Like voice coils 460 and 464 of scanner 400, voice coils 804 and 812 of scanner 600 may be energized to cause rotation or pivoting of suspension assembly 630, and thus prism 628, about one or more of two axes which are orthogonal to each other. For example, when voice coils 804 and 812 are actuated with in phase sinusoids, there is only rotation or pivoting of suspension assembly 630 and thus prism 628 about end 754 and with respect to MCR axis 746. When voice coils 804 and 812 are, instead, actuated with sinusoids that are 180 degrees out of phase, there is only rotation or pivoting of suspension assembly 630 and thus prism 628 about a pitch axis (as described below) which is orthogonal to MCR axis 746. Again, diagonal scans (which include rotation or pivoting about MCR axis 746 and the pitch axis) may also be carried out with when phase differences of the sinusoids in voice coils 804 and 812 are between 0 and 180 degrees.

Figure 9:
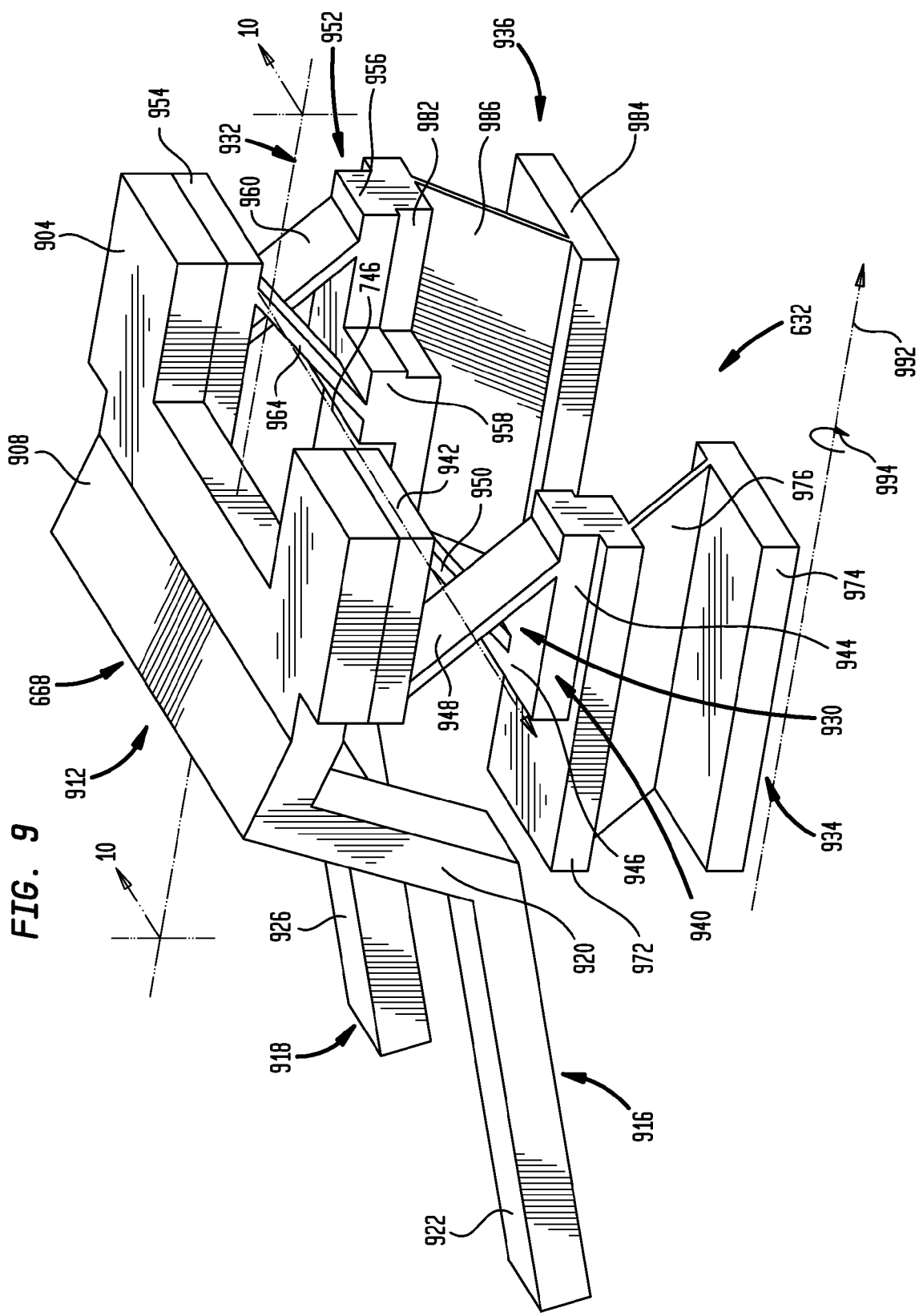
FIG. 9 is perspective view of the combination of the forward section of the prism carrier and magnet assembly and the flexure assembly used in the scanner of FIG. 6.
Figure 10:
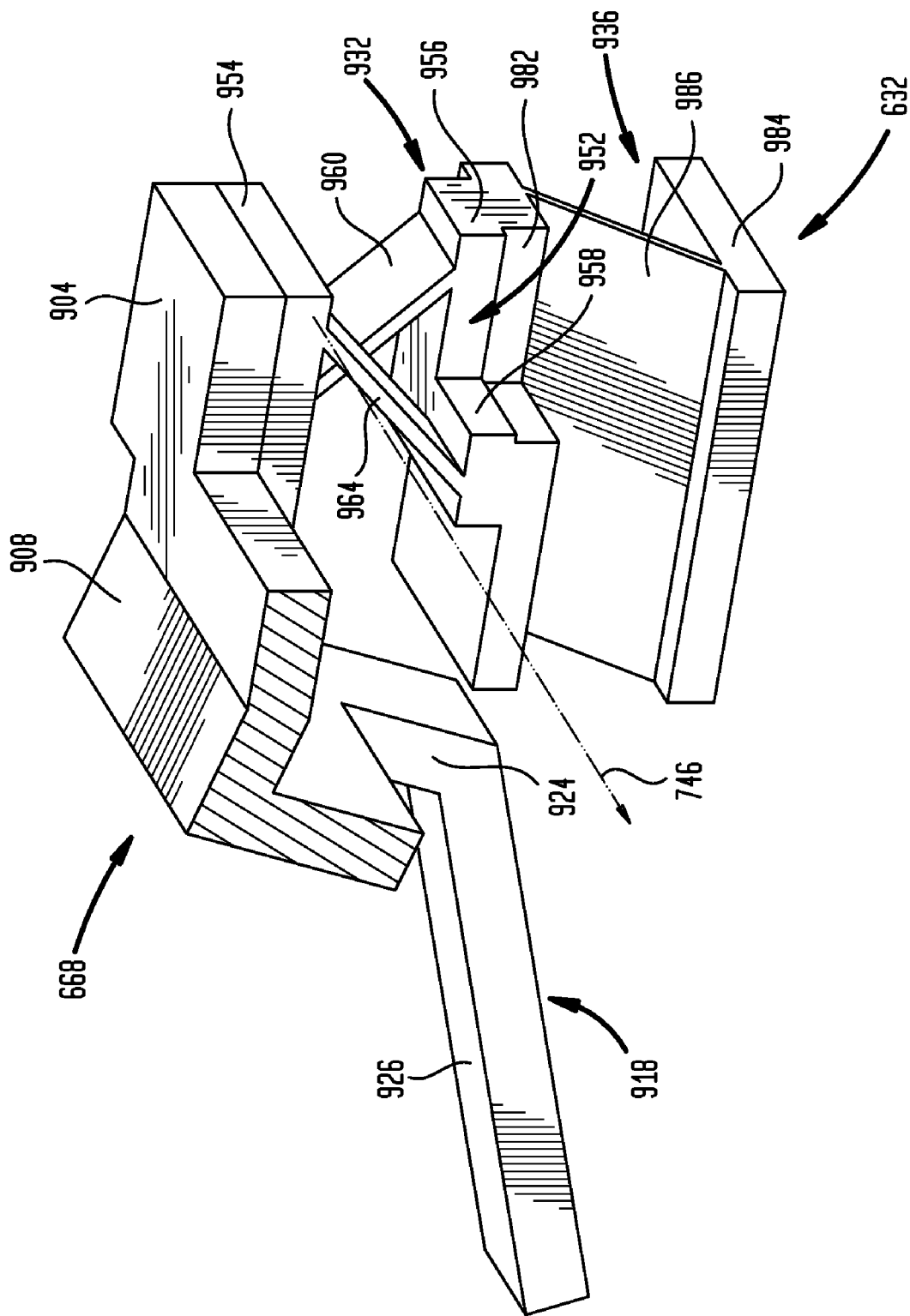
FIG. 10 is a sectional view of the suspension assembly and flexure assembly of FIG. 9 taken along line 10-10.

FIGS. 9 through 10 illustrate, in greater detail, forward section 668 of suspension assembly 630, as well as flexure assembly 632 which is attached or mounted thereto. Forward section 668 includes a generally C-shaped forward flexure assembly mounting portion 904, and a rearward portion 908. Rearward portion 908 comprises a base segment 912 and a pair of kinked or bent arms, indicated as 916 and 918, extending rearwardly and downwardly from each end of base segment 912. Arm 916 comprises a shorter segment 920 extending generally downwardly from one end of base segment 912, and a longer segment 922 extending generally rearwardly from shorter segment 918. Similarly, arm 918 comprises a shorter segment 924 extending generally downwardly from the other end of base segment 912, and a longer segment 926 extending rearwardly from shorter segment 924.

Flexure assembly 632 comprises a pair of spaced apart upper flexure components 930 and 932 mounted underneath and to flexure mounting portion 904 of forward section 668, and a pair of lower flexure components 934 and 936 mounted underneath and to, respectively, upper flexure components 930 and 932. Upper flexure component 930 comprises a generally L-shaped lower base segment 940, and a generally rectangular shaped upper segment 942. Lower base segment 940 has a longer forwardly extending section 944 and a shorter section 946 extending inwardly from one end of section 944. At least one flexure segment, for example, in the form of outer flexure segment 948 which extends diagonally upwardly and rearwardly in one direction to connect longer section 944 of lower base segment 940 to upper segment 942, while another inner flexure segment 950 extends diagonally and forwardly in the opposite direction to connect shorter section 946 of lower base segment 940 to upper segment 942, with outer and inner flexure segments 948 and 950 together forming a generally X-shaped structure. Similarly, upper flexure component 930 comprises an L-shaped lower base segment 952, and a rectangular shaped upper segment 954. Lower base segment has a longer forwardly extending section 956 and a shorter section 958 extending inwardly from one end of section 956 and towards opposite shorter section 946. At least one flexure segment, for example, in the form of outer flexure segment 960 which extends diagonally upwardly and rearwardly in one direction to connect longer section 956 of lower base segment 952, while another inner flexure segment 964 extends diagonally upwardly and forwardly in the opposite direction to connect shorter section 958 of lower base segment 956 to upper segment 954, with outer and inner flexure segments 960 and 964 together forming a generally X-shaped structure. Upper flexure components 930 and 932 of flexure assembly 632 (due to the flexibility provided or imparted by the respective X-shaped structures of upper flexure segments 948/950 and upper flexure segments 960/964) provides suspension assembly 630 (which is connected to flexure assembly 632) with the ability to rotate or pivot with respect to a stationary MCR axis 746, thereby also enabling or permitting prism 628 to rotate or pivot at a fixed position about end 754, and thus provide the ability to carry out stationary OCR scanning with scanner 600. In addition, the respective combination of flexure segments 948/950 and 960/964 of upper flexure components 930 and 932 provide the means for preloading the motion of suspension assembly 630 to thus enable prism 628 to controllably rotate or pivot with respect to MCR axis 746.

Lower flexure component 934 comprises an upper L-shaped segment 972, a rectangular-shaped lower base segment 974, and at least one flexure segment, for example, flexure segment 976, which extends diagonally upwardly and outwardly (i.e., perpendicular to the directions that upper flexure segments 948/950 diagonally extend) to connect lower base segment 974 to upper segment 972. Similarly, lower flexure component 936 comprises an upper L-shaped segment 982, a rectangular-shaped lower base segment 984, and at least one flexure segment, for example, flexure segment 986 which extends diagonally upwardly and outwardly (i.e., perpendicular to the directions that upper flexure segments 960/964 diagonally extend) to connect lower base segment 984 to upper segment 982. Lower flexure components 934 and 936 of flexure assembly 632, due to the flexibility provided or imparted by respective lower flexure segments 976 and 986 which extend diagonally upwardly and outwardly from respective lower base segments 974 and 984, provides assembly 630 with the ability to rotate or pivot about PA 992 (which is orthogonal or perpendicular to the MCR axis 746), as indicated by circular arrow 994, to thereby also enable or permit prism 628 to rotate or pivot with respect to PA 992, and thus provide for the ability to carry out orthogonal scanning with scanner 600. In addition, respective flexure segments 976 and 986 of lower flexure components 930 and 932 provide the means for preloading the motion of suspension assembly 630 to thus enable prism 628 to controllably rotate or pivot with respect to PA 992.

The benefits of scanner 600 shown in FIGS. 6 through 10 include: (1) the ability to use a single prism element 628 with refractive input face 704, reflective intermediate face 708, and refractive output face 712 as the reflector component; (2) prism 628 may be rotated or pivoted with respect to a stationary MCR axis 746, thus providing stationary OCR scanning about a well defined OCR 732; (3) prism 628 may provide a large (e.g., at least up to about 20 degree) scanning range which may be ideally suited to holographic data storage; (4) prism 628 may also act as an anamorphic or circularizing prism in that elliptical-shaped input beam 624 exits prism 628 as a substantially circular-shaped output beam 636; and (5) when prism 628 is rotated or pivoted about PA 992 (see FIG. 9), transverse or orthogonal scanning may also be possible for the purpose of, for example, pitch control.

Figure 11:
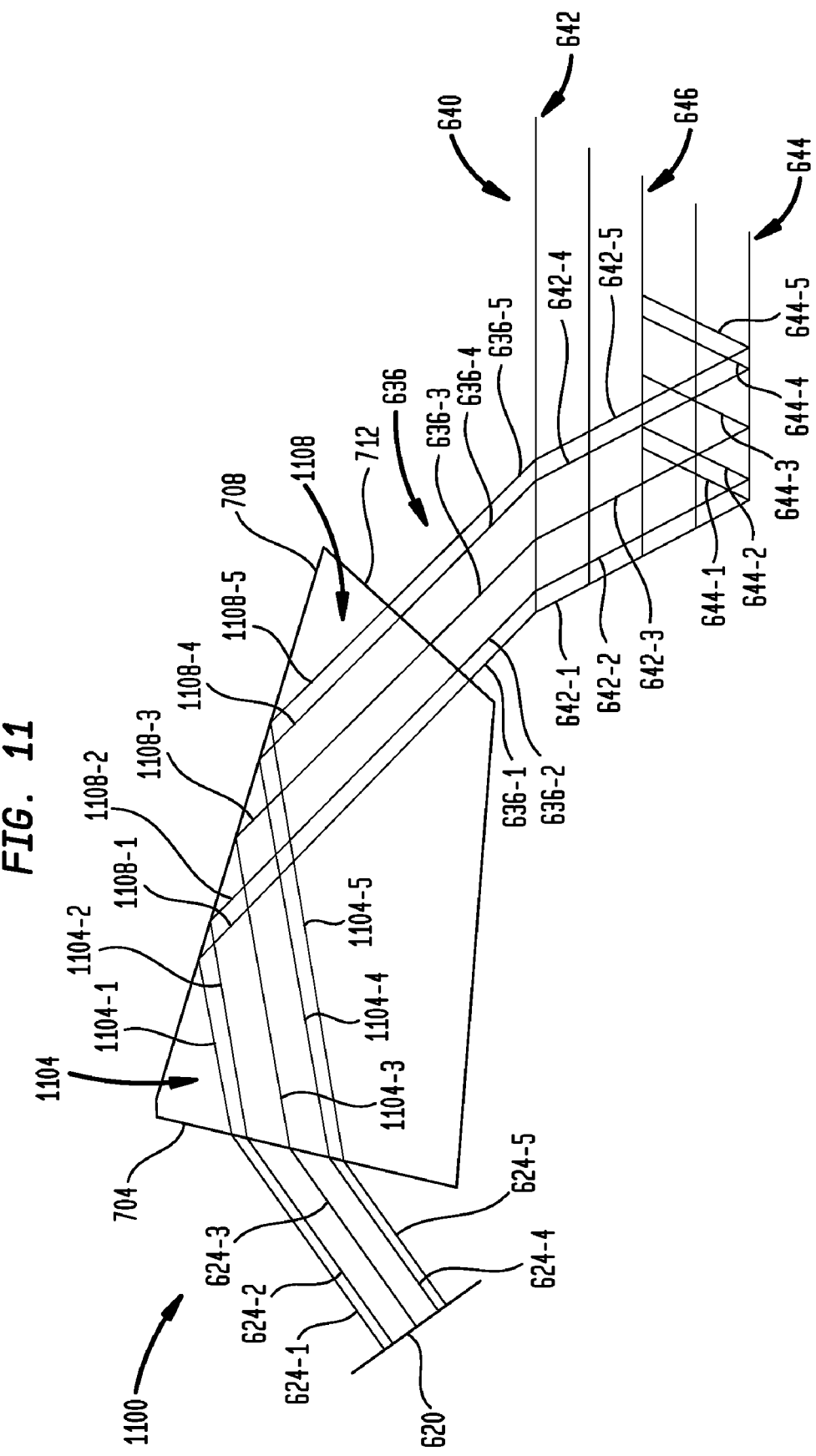
FIG. 11 is scanning diagram illustrating schematically the passage of the input beam through the prism of FIG. 6 when positioned at one angle.
Figure 12:
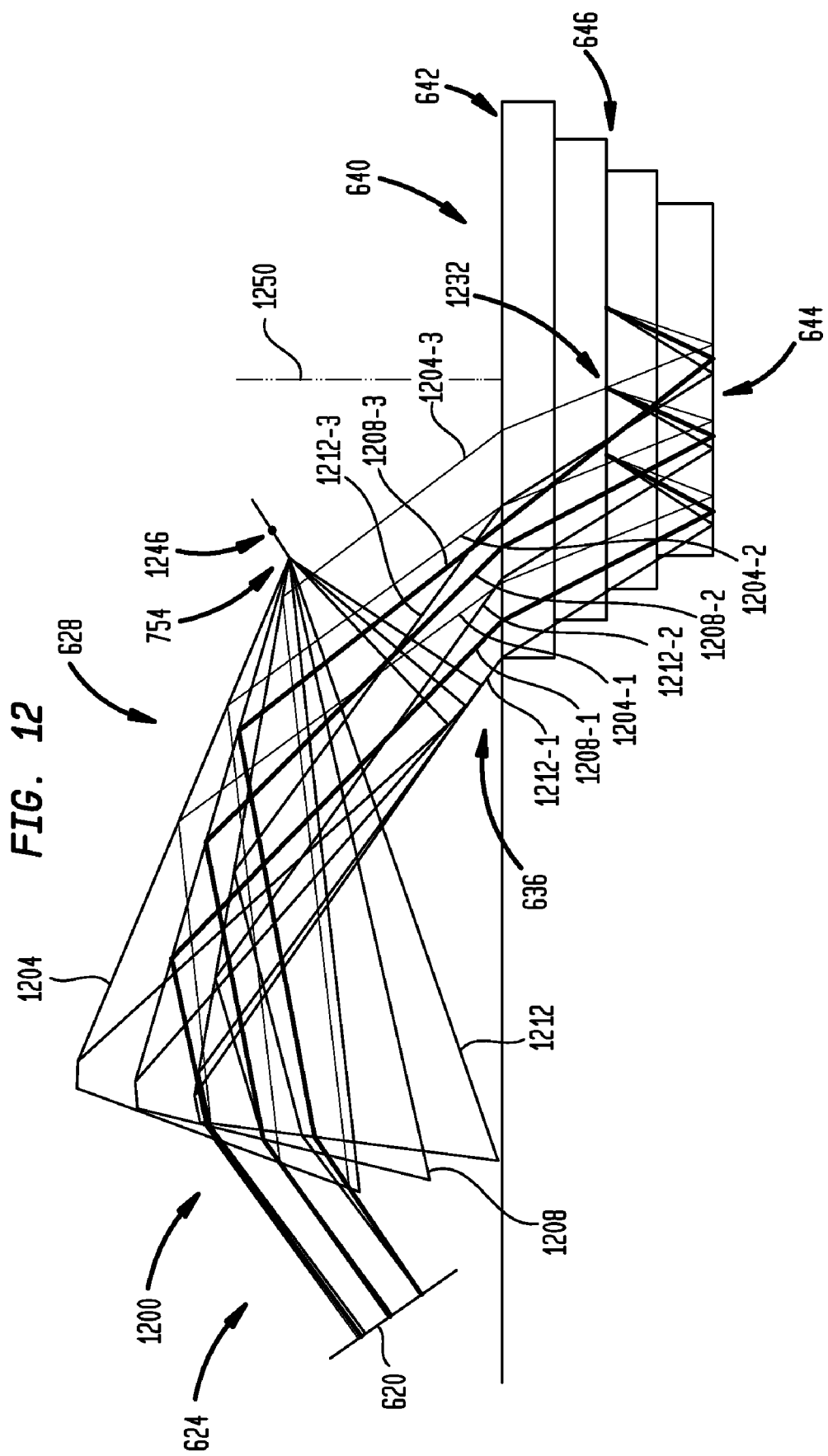
FIG. 12 is a scanning diagram illustrating schematically the passage of the input beam through the prism of FIG. 6 when rotated or pivoted to three different angles.
Figure 13:
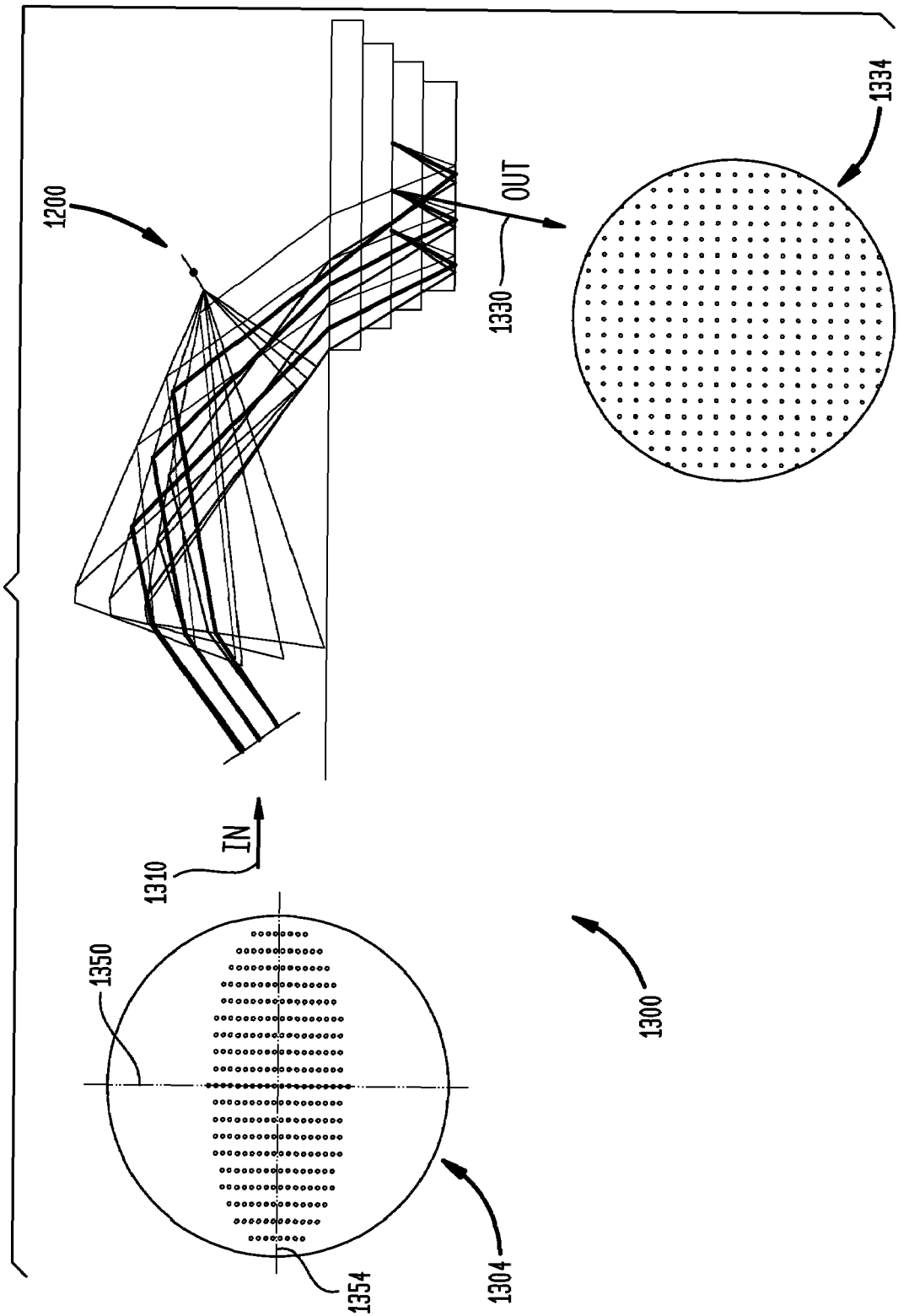
FIG. 13 is a circularization diagram illustrating the circularization occurring during the scans shown in FIG. 12.

The performance characteristics of the scanner 600 and especially prism 628 in operation are further illustrated in FIGS. 11 through 13. FIG. 11 provides a scanning diagram, indicated generally as 1100, which illustrates schematically the passage of input beam 624 through prism 628 when positioned at one angle. As shown in FIG. 11, input beam 624 reflected or directed from mirror 620 comprises a plurality of collimated beam lines, of which five representative beam lines 624-1 through 624-5 are shown. Input beam 624 (see beam lines 624-1 through 624-5) is refracted by input face 704 of prism 628 to provide a refracted beam 1104, of which five corresponding refracted beam lines 1104-1 through 1104-5 are shown. Refracted beam 1104 (see beam lines 1104-1 through 1104-5) is then reflected by reflective face 708 of prism 628 to provide reflected beam 1108, of which five corresponding reflected beam lines 1108-1 through 1108-5 are shown. Reflected beam 1108 (see beam lines 1108-1 through 1108-5) is then refracted by output face 712 to provide output beam 636, of which five corresponding output beam lines 636-1 through 636-5 are shown. Output beam 636 (see beam lines 636-1 through 636-5) reaches and is then refracted by upper surface 642 of medium 640 to provide corresponding refracted beam lines 642-1 through 642-5. Refracted beam lines 642-1 through 642-5 reach and are then reflected by backing surface 644 to provide five corresponding reflected beam lines 644-1 through 644-5. Reflected beam lines 644-1 through 644-5 are shown as terminating at midpoint 646 of medium 640.

FIG. 12 provides a scanning diagram, indicated generally as 1200, which illustrates schematically the passage of input beam 624 through prism 628 when rotated or pivoted to three different positions or angles corresponding to a 35° output beam, indicated generally as 1204, a 45° output beam, indicated generally as 1208, and a 55° output beam, indicated generally as 1212, about end 754 and with respect to the mechanical center of rotation (MCR) axis, indicated as 1246. (Position or angle 1212 corresponds to the position or angle of prism 628 shown in FIG. 11.) Beam lines indicated as 1204-1 through 1204-3 correspond generally to the top, middle and bottom of input beam 624 as it passes through prism 628 when rotated to position 1208 (35° output beam). Beam lines indicated as 1208-1 through 1208-3 correspond generally to the top, middle and bottom of input beam 624 as it passes through prism 628 when rotated to position 1208 (45° output beam). Beam lines indicated as 1212-1 through 1212-3 correspond generally to the top, middle and bottom of input beam 624 as it passes through prism 628 when rotated to position 1212 (55° output beam). As shown in FIG. 12, middle beam lines 1204-2, 1208-2 and 1212-2 reach the optical center of rotation (OCR), indicated as 1232, which also corresponds to the center of the scan rotation and the center of the hologram volume.

In determining the beam angle of output beam 632 when prism 628 is rotated or pivoted to the various positions or angles (e.g., positions or angles 1204, 1208 and 1212), reference is made to an output beam angle reference line, indicated by dashed line 1250, which is orthogonal (normal) to surface 642 of medium 640. For example, the beam angle made by output beam lines 1204-1, 1204-2 and 1204-3 with respect to surface 642 and relative to reference line 1250 is 35°, thus providing a 35° output beam 636. Similarly, the beam angle made by output beam lines 1208-1, 1208-2 and 1208-3 with respect to surface 642 and relative to reference line 1250 is 45° (thus providing a 45° output beam 636), while the beam angle made by output beam lines 1212-1, 1212-2 and 1212-3 with respect to surface 642 and relative to reference line 1250 is 55° (thus providing a 55° output beam 636). In other words, scanner 600 illustrated in FIG. 12 provides at least a 20 degree scan range (or the difference between the angle of output beam 636 when prism is rotated or pivoted to position 1204 and the angle of output beam 636 when prism is rotated or pivoted to position 1212). It should also be understood that the positions 1204, 1208 and 1212 of prism 628, the angles for output beam 636, and the scan range shown in FIG. 12 are illustrative, and that prism 628 may be rotated or pivoted to positions other than those shown in FIG. 12, may provide angles for output beam 636 other than those shown in FIG. 12, and may have wider (or narrower) scan ranges than that shown in FIG. 12.

FIG. 13 provides a circularization diagram, indicated generally as 1300, which illustrates schematically the circularization that may occur during the scans shown, for example, in scanning diagram 1200 of FIG. 12. The elliptical cross-sectional shape of input beam 624, prior to being processed by prism 628, is shown in circle 1304. Elliptical shaped input beam 624 may then be processed by prism 628, as indicated by "IN" arrow 1310 in FIG. 13. After processing by prism 628 (see scanning diagram 1200), the processed output beam 636 leaves prism 628, as indicated by "OUT" arrow 1330 in FIG. 13. The resulting circular cross-sectional shape of output beam 636, after processing by prism 628, is shown in circle 1334. As further shown, in FIG. 13, the elliptical cross-section of input beam 624 in circle 1304 has a short dimension axis, indicated by dashed line 1350, and a long dimension axis, indicated by dashed line 1354, which is orthogonal or perpendicular to short dimension axis 1350. In order to circularize input beam 624, prism 628 increases or "stretches" beam 624 when processed (i.e., "IN" arrow 1310) along short dimension axis 1350, with the degree of "stretching" or circularization being referred to in terms of Nx, where N is how much beam is stretched along axis 1350. For example, the 20 degree scan illustrated in FIG. 12 may provide the following degrees of circularization of input beam 624: for a 35° output beam 628, the degree of circularization may be as much as 1.9x (i.e., N=1.9); for a 45° output beam 628, the degree of circularization may be as much as 2.0x (i.e., N=2.0); and for a 55° output beam 628, the degree of circularization may be as much as 2.25x (i.e., N=2.25). The particular degree of circularization that may be achieved may depend on the specific design of the scanner. Laser diodes often require circularization of from about 1.7x to about 2.3x which may be achieved by embodiments of scanners of the present invention, e.g. scanner 600, thus avoiding the need for additional circularizing components when using a laser diode.

It should be appreciated that the specific embodiments illustrated in FIGS. 1 through 13 are provided to illustrate the teachings of the present invention. Alterations or modification within the skill of the art of the specific embodiments illustrated in FIGS. 1 through 13 are considered within the scope of the present invention, so long as these alterations or modifications operate in a same or similar manner, function, etc. These modifications may include the use of a single assembly, member, element, component, etc. (in place of a plurality of assemblies, members, elements, components, etc.), the use of a plurality of assemblies, members, elements, components, etc. (in place of a single of assembly, member, element, component, etc.), the changing of the order, orientation, direction, position, etc., of any of the assemblies, members, elements, components, etc., the combining or integrating of any of the assemblies, members, elements, components, etc., into a single or unified assembly, member element, component, etc., or the ungrouping of an assembly, member, element, component, etc., into a plurality of associated assemblies, members, elements, components, etc. For example, while the specific embodiments illustrated in FIGS. 4 through 13 show scanners 400 and 600 being oriented generally horizontally, scanners 400 and 600 may also be oriented generally vertically, or in any other orientation without departing from the scope of the present invention.

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A device comprising a flexure assembly and reflective component suspension assembly connected to the flexure assembly, the flexure assembly comprising:

a pair of spaced apart upper flexure components which enable the suspension assembly to controllably pivot with respect to a stationary mechanical center of rotation axis;

each of the upper flexure components having a lower base segment, an upper segment, and at least one flexure segment diagonally connecting the lower base segment of the upper flexure component to the upper segment of the upper flexure component; and a pair of spaced apart lower flexure components which enable the suspension assembly to controllably pivot with respect to an axis orthogonal to the mechanical center rotation axis;

one of the lower flexure components being mounted underneath one of the upper flexure components, the other of the lower flexure components being mounted underneath the other of the upper flexure components;

each of the lower flexure components having a lower base segment, an upper segment, and at least one flexure segment extending diagonally and outwardly with respect to the orthogonal axis, and connecting the lower base segment of the lower flexure component to the upper segment of the lower flexure component.

2. The device of claim 1, wherein the suspension assembly comprises a forward section having a flexure assembly mounting portion, and wherein the upper flexure components are mounted underneath and to the flexure assembly mounting portion.

3. The device of claim 1 wherein the at least one upper flexure segments enables the suspension assembly to controllably pivot with respect to a first axis, and wherein the at least one lower flexure segments enable the suspensions assembly to controllably pivot with respect to a second axis orthogonal to the first axis.

4. The device of claim 1, wherein each of the at least one upper flexure segments comprises a pair of upper flexure segments diagonally connecting the lower base segment to the upper segment so as to form a generally X-shaped structure.

5. The device of claim 4, wherein the lower base segment of each upper flexure component is generally L-shaped and has a longer section and a shorter section extending from one end of the longer section, and wherein one of the pair of upper flexure segments extends diagonally upwardly in one direction to connect the longer section to the upper segment of the upper flexure component, and wherein the other of the pair of upper flexure segments extends upwardly in the opposite direction to connect the shorter section to the upper segment of the upper flexure component.

6. The device of claim 5, wherein the shorter sections extend inwardly and towards each other.

7. The device of claim 1, wherein the at least one lower flexure segments comprises one lower flexure segment.

8. The device of claim 7, wherein each lower flexure segment extends diagonally upwardly from the lower base segment of the lower flexure component to the upper segment of the lower flexure component and in a direction perpendicular to the direction that the upper flexure segments diagonally extend.

* * * * *